(12) United States Patent
Yu et al.

(10) Patent No.: US 8,639,064 B2
(45) Date of Patent: Jan. 28, 2014

(54) OPTICAL ISOLATION CREATED BY INDIRECT INTERBAND PHOTONIC TRANSITIONS

(75) Inventors: Zongfu Yu, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1245 days.

(21) Appl. No.: 12/496,474

(22) Filed: Jul. 1, 2009

(65) Prior Publication Data

US 2011/0002573 A1 Jan. 6, 2011

(51) Int. Cl.
*G02F 1/035* (2006.01)

(52) U.S. Cl.
USPC ............................................................ 385/2

(58) Field of Classification Search
None
See application file for complete search history.

(56) References Cited

PUBLICATIONS

Zhou et al. Wavelength-Selective Optical Waveguide Isolator Based on Nonreciprocal Ring-Coupled Mach-Zehnder Interferometer, Sep. 2008, Journal of Lightwave Technology, vol. 26 No. 17, pp. 3166-3172.*
Almeida, V. R. Barrios, C. A. Panepucci, R. R. & Lipson, M. All-optical control of light on a silicon chip. *See, Nature*, 431, 1081-1084 (2004).
de Lima et al., "Active Photonic Crystals Based on Surface Acoustic Waves", Applied Physics Letters, vol. 82, No. 15, Oct. 13, 2003, pp. 2997-2999.
de Lima et al., "Embedded Interdigital Transducers for High-Frequency Surface Acoustic Waves on GaAs", Journal of Applied Physics, vol. 96, No. 6, Sep. 15, 2004, pp. 3494-3499.
de Lima et al., "Modulation of Photonic Structures by Surface Acoustic Waves", Rep. Prog. Phys. 68 (2005) pp. 1639-1701.
Dong, P. Preble, S. F. Robinson, J. T. Manipatruni, S. & Lipson, M. "Inducing photonic transitions between discrete modes in a silicon optical microcavity," *Phys. Rev. Lett.* 100, 033904 (2008).
Dotsch, H. et al. "Applications of magneto-optical waveguides in integrated optics: review," *J. Opt. Soc. Am. B* 22, 240-253 (2005).
Espinola, R. L. Izuhara, T. Tsai, M. -C Osgood, R. M. Jr. & Dötsch, H. "Magneto-optical nonreciprocal phase shift in garnet/silicon-on-insulator waveguides," *Opt. Lett.* 29, 941-943 (2004).
Gallo, K. Assanto, G. Parameswaran, K. R. and Fejer, M. M. "All-optical diode in a periodically poled lithium niobate waveguide," *Appl. Phys. Lett.* 79, 314-316 (2001).
Harris, et al., "Electronically tunable acousto-optic filter," *Appl. Phys. Lett.* 15, 325-26 (1969).
Ibrahim, S. K. Bhandare, S. Sandel, D. Zhang, H. & Noe, R. "Nonmagnetic 30 dB integrated optical isolator in III/V material," *Electron. Lett.* 40, 1293-1294 (2004).
Levy, M. "A nanomagnetic route to bias magnet-free, on-chip Faraday rotators," *J. Opt. Soc. Am. B* 22, 254-260 (2005).

(Continued)

*Primary Examiner* — Sarah Hahm
(74) *Attorney, Agent, or Firm* — Davis Wright Tremaine LLP

(57) ABSTRACT

The refractive index of the at least one photonic structure having two separate photonic bands is modulated, so that light supplied to the at least one photonic structure and initially in one of the two photonic bands of the traveling along a forward direction in the at least one photonic structure is converted to light in a second one of the photonic bands, and light in the one photonic band traveling along a backward direction opposite to the forward direction in the at least one photonic structure is not converted and remains in the one photonic band, achieving non-reciprocity.

21 Claims, 12 Drawing Sheets

(56) References Cited

PUBLICATIONS

L. Liao, A. Liu, D. Rubin, J. Basak, Y. Chetrit, H. Nguyen, R. Cohen, N. Izhaky, and M. Paniccia, *Electron. Lett.* 43, 1196 (2007).

Miller, D. A. B. "Optical interconnects to silicon," *IEEE J. Sel. Top. Quant. Electron.* 6, 312-1317 (2000).

Preble, S. F. Xu, Q. & Lipson, M. "Changing the colour of light in a silicon resonator," *Nature Photonics*, 1, 293-296 (2007).

Soljacic, M. & Joannopoulos, J. D. "Enhancement of nonlinear effects using photonic crystals," *Nature Material* 3, 211-219 (2004).

Soljaic, M. Luo, C. Joannopoulos, J. D. & Fan, S. "Nonlinear photonic microdevices for optical integrations," *Opt. Lett.* 28, 637-639 (2003).

Winn, J. N. Fan, S. Joannopoulos, J. D. & Ippen, E. P. "Interband transitions in photonic crystals," *Phys. Rev.B* 59, 1551-1554 (1998).

Xu et al., "Micrometre-Scale Silicon Electro-Optic Modulator", Nature, vol. 435., No. 19, May 2005, pp. 325-327.

J. B. Yoo, *Nature Photonics* (News and Views) 3, 77 (2009).

Z. Yu and S. Fan, *Nature Photonics* 3, 91 (2009).

Zaman, T. R. Guo, X. & Ram, R. J. "Faraday rotation in an InP waveguide," *Appl. Phys. Lett.* 90, 023514 (2007).

\* cited by examiner

OPTICAL ISOLATION CREATED BY INDIRECT INTERBAND PHOTONIC TRANSITIONS

This invention was made with support from the United States Government under grant number NSF (Grant No. ECS-0622212). The United States Government has rights in this invention.

BACKGROUND OF THE INVENTION

This invention relates in general to photonics, and in particular to the modulation of photonic structures for achieving non-reciprocal optical effects for various applications, such as optical isolation.

Achieving on-chip optical signal isolation is a fundamental difficulty in integrated photonics, see Soljacic, M. & Joannopoulos, J. D. "Enhancement of nonlinear effects using photonic crystals," *Nature Material* 3, 211-219 (2004). The need to overcome this difficulty, moreover, is becoming increasingly urgent, especially with the emergence of silicon nanophotonics, see Pavesi, L. & Lockwood, *Silicon Photonics* (Springer, Berlin, 2004), Almeida, V. R. Barrios, C. A. Panepucci, R. R. & Lipson, M. All-optical control of light on a silicon chip. See, *Nature*, 431, 1081-1084 (2004), Miller, D. A. B. "Optical interconnects to silicon," *IEEE J. Sel. Top. Quant. Electron.* 6, 1312-1317 (2000), which promise to create on-chip optical systems at an unprecedented scale of integration. In spite of many efforts, there have been no techniques that provide complete on-chip signal isolation using materials or processes that are fundamentally compatible with silicon CMOS process. Here we introduce an isolation mechanism based on indirect interband photonic transition. Photonic transition, as induced by refractive index modulation, see Winn, J. N. Fan, S. Joannopoulos, J. D. & Ippen, E. P. "Interband transitions in photonic crystals," *Phys. Rev. B* 59, 1551-1554 (1998), has been recently observed experimentally in silicon nanophotonic structures, see Dong, P. Preble, S. F. Robinson, J. T. Manipatruni, S. & Lipson, M. "Inducing photonic transitions between discrete modes in a silicon optical microcavity," *Phys. Rev. Lett.* 100, 033904 (2008). Here we show that a linear, broad-band, and non-reciprocal isolation can be accomplished by spatial-temporal modulations that simultaneously impart frequency and wavevector shifts during the photonic transition process. We further show that non-reciprocal effect can be accomplished in dynamically-modulated micron-scale ring-resonator structures.

To create complete optical signal isolation requires time-reversal symmetry breaking. In bulk optics, this is achieved using materials exhibiting magneto-optical effects. Despite many efforts however see Espinola, R. L. Izuhara, T. Tsai, M.-C. Osgood, R. M. Jr. & Dötsch, H. "Magneto-optical nonreciprocal phase shift in garnet/silicon-on-insulator waveguides," *Opt. Lett.* 29, 941-943 (2004), Levy, M. "A nanomagnetic route to bias magnet-free, on-chip Faraday rotators," *J. Opt. Soc. Am. B* 22, 254-260 (2005), Zaman, T. R. Guo, X. & Ram, R. J. "Faraday rotation in an InP waveguide," *Appl. Phys. Lett.* 90, 023514 (2007), Dotsch, H. et al. "Applications of magneto-optical waveguides in integrated optics: review," *J. Opt. Soc. Am. B* 22, 240-253 (2005), on-chip integration of magneto-optical materials, especially in silicon in a CMOS compatible fashion, remains a great difficulty. Alternatively, optical isolation has also been observed using nonlinear optical processes, see Soljacic, M. Luo, C. Joannopoulos, J. D. & Fan, S. "Nonlinear photonic microdevices for optical integrations," *Opt. Lett.* 28, 637-639 (2003), Gallo, K. Assanto, G. Parameswaran, K. R. and Fejer, M. M. "All-optical diode in a periodically poled lithium niobate waveguide," *Appl. Phys. Lett.* 79, 314-316 (2001), or in electro-absorption modulators, see Ibrahim, S. K. Bhandare, S. Sandel, D. Zhang, H. & Noe, R. "Non-magnetic 30 dB integrated optical isolator in III/V material," *Electron. Lett.* 40, 1293-1294 (2004). In either case, however, optical isolation occurs only at specific power ranges, see Soljaic, M. Luo, C. Joannopoulos, J. D. & Fan, S. "Nonlinear photonic microdevices for optical integrations," *Opt. Lett.* 28, 637-639 (2003), Gallo, K. Assanto, G. Parameswaran, K. R. and Fejer, M. M. "All-optical diode in a periodically poled lithium niobate waveguide," *Appl. Phys. Lett.* 79, 314-316 (2001), or with associated modulation side bands, see Ibrahim, S. K. Bhandare, S. Sandel, D. Zhang, H. & Noe, R. "Non-magnetic 30 dB integrated optical isolator in III/V material," *Electron. Lett.* 40, 1293-1294 (2004). In addition, there have been works aiming to achieve partial optical isolation in reciprocal structures that have no inversion symmetry (for example, chiral structures). In these systems, the apparent isolation occurs by restricting the allowed photon states in the backward direction, and would not work for arbitrary backward incoming states. None of the non-magnetic schemes, up to now, can provide complete optical isolation.

SUMMARY

At least a first photonic structure is provided that has two separate photonic bands, and a refractive index. The refractive index of the at least first photonic structure is modulated, so that light supplied to the at least first photonic structure and initially in a first one of the photonic bands traveling along a forward direction in the at least first photonic structure is converted to light in a second one of the photonic bands, and light in the first photonic band traveling along a backward direction opposite to the forward direction in the at least first photonic structure is not converted and remains in the first photonic band. Non-reciprocal is thus achieved with respect to light traveling in the forward and backward directions.

The conversion of light from one photonic band to another is done, either with, or without altering a polarization state of the light. Also preferably, the band width of the two separate photonic bands are not less than about 0.1% of the wavelength of the light, and more preferably not less than about 0.2% of the wavelength of the light. Where a companion photonic structure that is aligned with and coupled to the at least first photonic structure is used together with the at least first photonic structure, the band width of the two separate photonic bands are not less than about 1% of the wavelength of the light, and more preferably not less than about 2% of the wavelength of the light.

Another embodiment of the invention is directed to an interferometer and a method for creating non-reciprocity using the interferometer, comprising a first and a second photonic structure coupled to the at least first photonic structure at two coupler regions, said first photonic structure having two separate photonic bands and a refractive index. The refractive index of the first photonic structure is modulated, so that light supplied to the first photonic structure and initially in a first one of the photonic bands traveling along a forward direction in the at least first photonic structure is converted to light in a second one of the photonic bands, and light in the first photonic band traveling along a backward direction opposite to the forward direction in the at least first photonic structure is not converted and remains in the first photonic band. Light supplied to a first end of the first photonic structure and initially in the first photonic band traveling along a forward direction in the photonic structures will pass to a second end of the first photonic structure, and light supplied to the second end of the first photonic structure and traveling along a backward direction in the photonic structures will pass to an end of the second photonic structure. As a result, light passing through the first photonic structure acquires a non-reciprocal phase. A non-reciprocal device can then be constructed through the interferometer set up.

BRIEF DESCRIPTION OF THE DRAWINGS

FIG. 1 (c) shows the modulation profile at two sequential time steps.

FIG. 2(a) shows the spatial evolution of the photon flux N of two modes, when a phase-matching modulation is applied to the waveguide. The two solid lines are analytical theory and circles are FDTD simulation.

FIG. 2(b) shows the spectrum of photon flux in the incident pulse.

FIGS. 2(c)-2(d) show the transmitted photon flux spectra, when the pulse in FIG. 2(b) is incident direction from left (FIG. 2 (c)) or right (FIG. 2 (d)). Insets in FIGS. 2(c)-2(d) show the distribution of electric fields from FDTD simulation, with continuous wave excitation at $\omega_1$. The arrows represent the direction of incidence, and the yellow rectangle indicates the modulated waveguide region.

FIG. 3 is a schematic view of a ring resonator designed for non-reciprocal frequency conversion. The dark regions are modulated. The diameter of the rods is 0.08 a with their centers along a circle with radius R=3.08 a. The spacing between centers of two adjacent circles is 0.1 a.

FIGS. 2(a)-2(b) illustrate distribution of electric fields with continuous wave incident at $\omega_1$. FIGS. 2(c)-2(d) illustrate the output spectra. The dashed lines are the input spectra. The solid lines are the output spectra calculated analytically. The circles are from FDTD simulation.

For convenience in description, identical components are labeled by the same numbers in this application.

DETAILED DESCRIPTION

We have shown that complete optical isolation can be achieved dynamically, by inducing indirect photonic transitions in an appropriately designed photonic structure. The photonic structure can be a waveguide, such as one made of a dielectric material. It was shown theoretically, see Winn, J. N. Fan, S. Joannopoulos, J. D. & Ippen, E. P. "Interband transitions in photonic crystals," Phys. Rev. B 59, 1551-1554 (1998), that when subject photonic structures to temporal refractive index modulation, photon states can go through interband transitions, in a direct analogy to electronic transitions in semiconductors. Such photonic transitions have been recently demonstrated experimentally in silicon micro-ring resonators, see Dong, P. Preble, S. F. Robinson, J. T. Manipatruni, S. & Lipson, M. "Inducing photonic transitions between discrete modes in a silicon optical microcavity," Phys. Rev. Lett. 100, 033904 (2008). Building upon these advancements, here we show that by appropriately design a bandstructure, and by choosing a spatially and temporally varying modulation format that simultaneously imparts frequency and momentum shifts of photon states during the transition process, (FIG. 1a), the transmission behavior of a photonic structure can become non-reciprocal: light of frequency $\omega_1$ in forward direction in a first photonic band is converted to a higher frequency mode $\omega_2$ in a second photonic band by the modulation. This modulation can be achieved by modulation of the dielectric constant of the structure. At the same time, such a modulation has no effect on the light propagating in the backward direction at all frequencies and therefore leaves the mode in the backward direction intact. Combined with an absorption filter with a stopband centered at $\omega_2$, this structure can absorb all lights incident from one direction at $\omega_1$, while passing those in the opposite direction, and thus creates a complete isolator behavior. Obviously, it is possible to use an absorption filter with a passband centered at $\omega_1$, this structure can absorb all lights at $\omega_2$, while passing light centered at $\omega_1$, and create a complete isolator behavior. Such filters can be used to filter light and perform an isolation function.

Figure 1A:
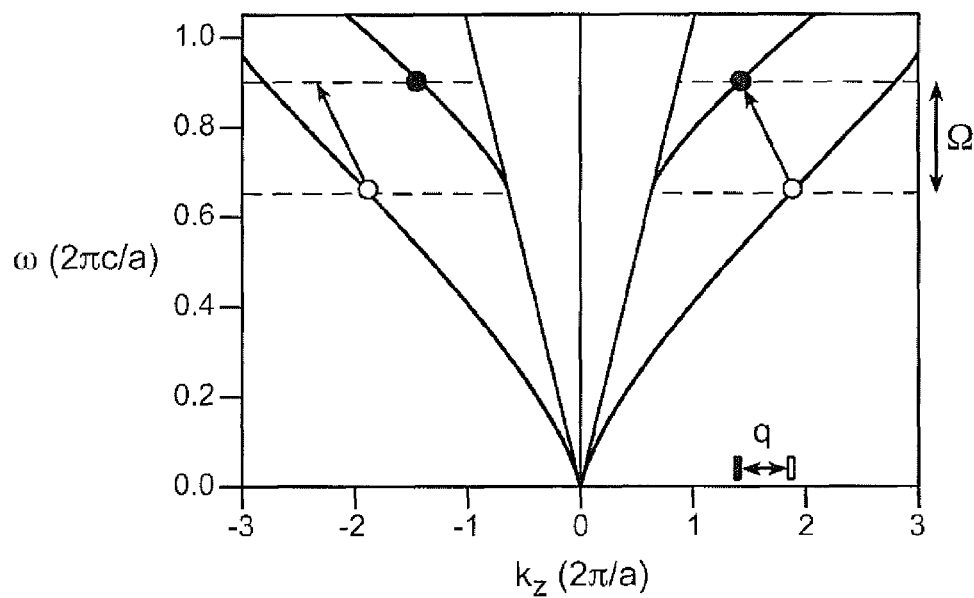
FIG. 1(a) shows a bandstructure of a silicon waveguide. The width of the waveguide is 0.22 μm. The angular frequency and wavevectors are normalized with respect to a=1 μm. The dots indicate modes at frequencies $\omega_1$ and $\omega_2$ in the first and second bands. The arrows indicate frequency and wavevector shift as induced by a dynamic modulation shown in FIG. 1 (b) and FIG. 1 (c).

We start by demonstrating such dynamic processes in a silicon waveguide. The waveguide (assumed to be two-dimensional) is represented by a dielectric distribution $\epsilon_s(x)$ that is time-independent and uniform along the z-direction. Such a waveguide possesses a band structure as shown in FIG. 1a; with symmetric and anti-symmetric modes located in the first and second band, respectively. An interband transition, between two modes with frequencies and wavevectors ($\omega_1$, $k_1$), ($\omega_2$,$k_2$) located in these two bands, can be induced by modulating the waveguide with an additional dielectric perturbation:

$$\epsilon'(x,z,t)=\delta(x)\cos(\Omega t-qz) \quad (1)$$

Here the modulation frequency (of the modulating device) $\Omega=\omega_2-\omega_1$. We assume the wavevector q that approximately satisfies the phase-matching condition, i.e. $\Delta k=k_2-k_1-q\approx 0$. In the modulated waveguide, the electric field becomes:

$$E(x,z,t)=a_1(z)E_1(x)e^{i(-k_1z+\omega_1 t)}+a_2(z)E_2(x)e^{i(-k_2z+\omega_2 t)}, \quad (2)$$

where $E_{1,2}(x)$ are the modal profiles, normalized such that $|a_n|^2$ is the photon number flux carried by the n-th mode. By substituting equation (2) into the Maxwell's equations, and using slowly varying envelope approximation, we can derive the coupled mode equation:

$$\frac{d}{dz}\begin{pmatrix}a_1\\a_2\end{pmatrix}=\begin{pmatrix}0 & iC\exp(-i\Delta kz)\\iC*\exp(i\Delta kz) & 0\end{pmatrix}\begin{pmatrix}a_1\\a_2\end{pmatrix}, \quad (3)$$

where $$C=\frac{\varepsilon_0}{8}\int_{-\infty}^{\infty}\delta(x)E_1^*(x)E_2(x)dx$$

is the coupling strength. With an initial condition $a_1(0)=1$ and $a_2(0)=0$, the solution to equation (3) is:

$$a_1(z)=e^{-iz\Delta k/2}\left[\cos\left(z\sqrt{C^2+(\Delta k/2)^2}\right)+i\frac{\Delta k/2}{\sqrt{C^2+(\Delta k/2)^2}}\sin\left(z\sqrt{C^2+(\Delta k/2)^2}\right)\right] \quad (4)$$

$$a_2(z)=ie^{iz\Delta k/2}\frac{C\sin\left(z\sqrt{C^2+(\Delta k/2)^2}\right)}{\sqrt{C^2+(\Delta k/2)^2}}$$

In the case of perfect phase-matching, i.e. $\Delta k=0$, a photon initially in mode 1 will make a complete transition to mode 2 after propagating over a distance of coherence length $$l_c=\frac{\pi}{2|C|}.$$

In contrast, in the case of strong phase-mismatch, i.e. $|\Delta k|>>=0$, the transition amplitude is negligible. The term coherence length as used herein means the distance of travel of light propagation in the photonic structure after which there is complete conversion from one mode to the other mode (i.e. from one photonic band to the other photonic band). The modulation device can be one that generates acoustic waves. See, for example, any one for the followings references:

(1) de Lima et al., "Active Photonic Crystals Based on Surface Acoustic Waves", Applied Physics Letters, Vol. 82, No. 15, Oct. 13, 2003, pp. 2997-99;

(2) de Lima et al., "Embedded Interdigital Transducers for High-Frequency Surface Acoustic Waves on GaAs", Journal of Applied Physics, Vol. 96, No. 6, Sep. 15, 2004, pp. 3494-99; and (3) de Lima et al., "Modulation of Photonic Structures by Surface Acoustic Waves", Rep. Prog. Phys. 68 (2005) pp. 1639-1701. The modulation is applied at locations that are spaced evenly apart at one half, one third or one quarter of a spatial modulation period of the photonic structure (such as that of the waveguide).

Alternatively, the modulation device can be one that injects holes and electrons. See for example, Xu et al., "Micrometer-Scale Silicon Electro-Optic Modulator", Nature, Vol 435., No. 19, May 2005, pp. 325-27.

The system as shown in FIG. 1a exhibits strong non-reciprocal behavior: the modulation in equation (1) does not phase-match the mode at ($\omega_1$,-$k_1$) with any other mode of the system (FIG. 1a). Thus, while the mode at ($\omega_1$,$k_1$) undergoes a complete photonic transition, its time-reversed counterpart at ($\omega_1$,-$k_1$) is not affected at all. Such non-reciprocity arises from the breaking of both time-reversal and spatial-inversion symmetries in the dynamics: The modulation in equation (1) is not invariant with either t→−t or z→−z.

Figure 1B:
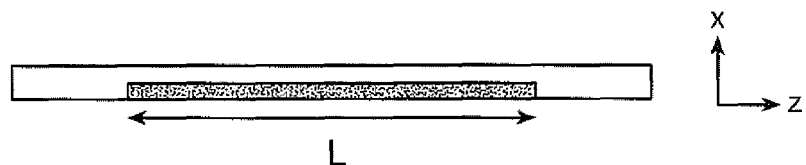
FIG. 1 (b) shows a structure of a silicon ($\epsilon_s$=12.25) waveguide. Modulation is applied to the dark region.
Figure 1C:
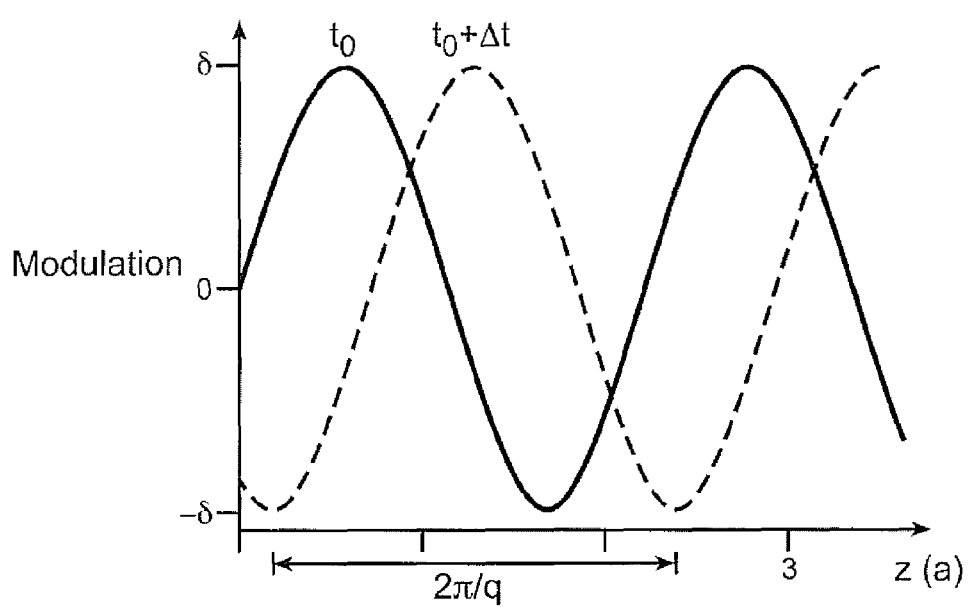

To verify the theory above, we numerically simulate the dynamic process by solving Maxwell equations with finite-difference time-domain (FDTD) method, see Taflove, A. & Hagness, S. C. "Computational Electrodynamics: the Finite-Difference Time-Domain Method," 2nd ed. (Artech House, Boston, 2000). For concreteness, the width of the waveguide is chosen to be 0.22 µm, such that the waveguide supports a single TE mode at the 1.55 µm wavelength range. To maximize the coupling strength, the modulation region is chosen to occupy half of the waveguide width (FIG. 1b). FIG. 1c shows the profile of such dynamic modulation at two sequential time steps, with a phase-matching condition that induces a transition between mode 1 at $$\omega_1=0.6468\left(\frac{2\pi c}{a}\right)$$

and mode 2 at $$\omega_2=0.8879\left(\frac{2\pi c}{a}\right)(a=1\ \mu m).$$

For visualization purposes, we choose large modulation strength $$\left(\frac{\delta_{max}}{\varepsilon}=\frac{1}{12.25}\right)$$

in equation (1)) such that the effect can be observed with a relatively short waveguide.

In the simulation, we first choose the length of the modulation region (=20 a) to be much longer than the coherence length. A continuous wave at $\omega_1$ is launched at the left end of the structure. As the wave propagates along the +z direction, part of the amplitude is converted to $\omega_2$. The intensities of the waves at the two frequencies oscillate sinusoidally along the propagation direction (FIG. 2a), while conserving the total numbers of photons. From the simulation, the coherence length $l_c$ is determined to be 10.2 a. From FIG. 2(a), it will be apparent that after traveling the coherence length, light at $\omega_1$ is converted completely to light at $\omega_2$, but when traveling beyond the coherence length, light at $\omega_2$ is converted back to light at $\omega_1$. This is true also when the light has traveled any odd multiple of the coherence length in the photonic structure.

We now demonstrate non-reciprocal frequency conversion, by choosing the length of the modulation region to be the coherence length $L=l_c$ (FIG. 1b). We choose an incident light pulse to the photonic structure with a Gaussian spectrum centered at $\omega_1$ (FIG. 2b). When such a pulse is incident from the left of the photonic structure, such as the one in FIG. 1b, it is completely converted to a pulse centered at $\omega_2$ (FIG. 2c), which pulse is then provided as a light output from the photonic structure, such as the one in FIG. 1b. The mode profile completely converts from symmetric to antisymmetric after passing through the modulated region (Inset in FIG. 2c). In contrast, the same pulse, when incident from the right of the photonic structure, such as the one in FIG. 1b, passes through the structure unperturbed (FIG. 2d). Thus, this structure provides complete contrast between forward and backward directions. In addition, we have observed that incident light from the right around $\omega_2$ does not experience any frequency conversion either. The response of the system certainly is not time-reversal invariant.

Figure 2A:
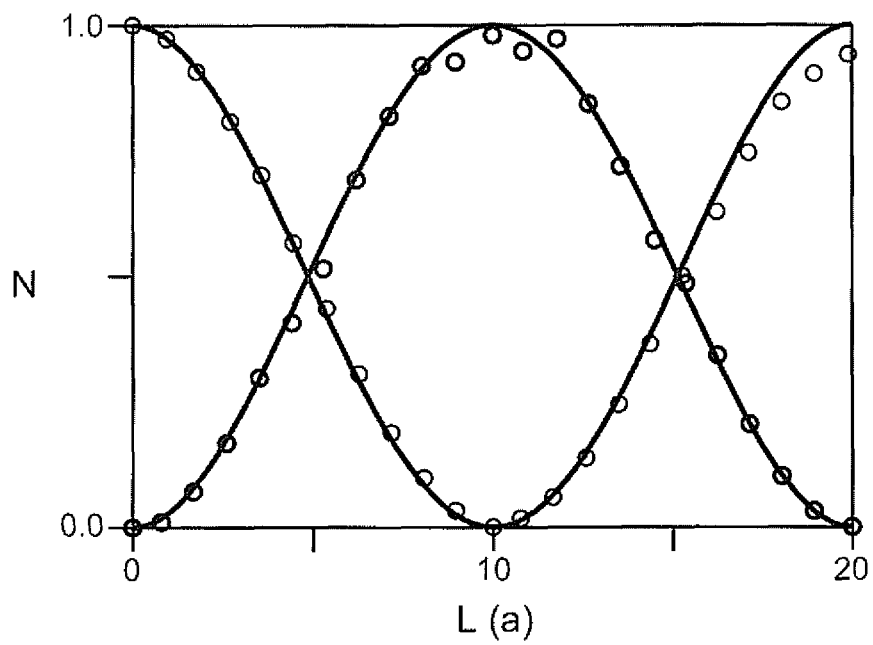
FIGS. 2(a)-2(d) illustrate nonreciprocal frequency conversion in a waveguide.
Figure 2B:
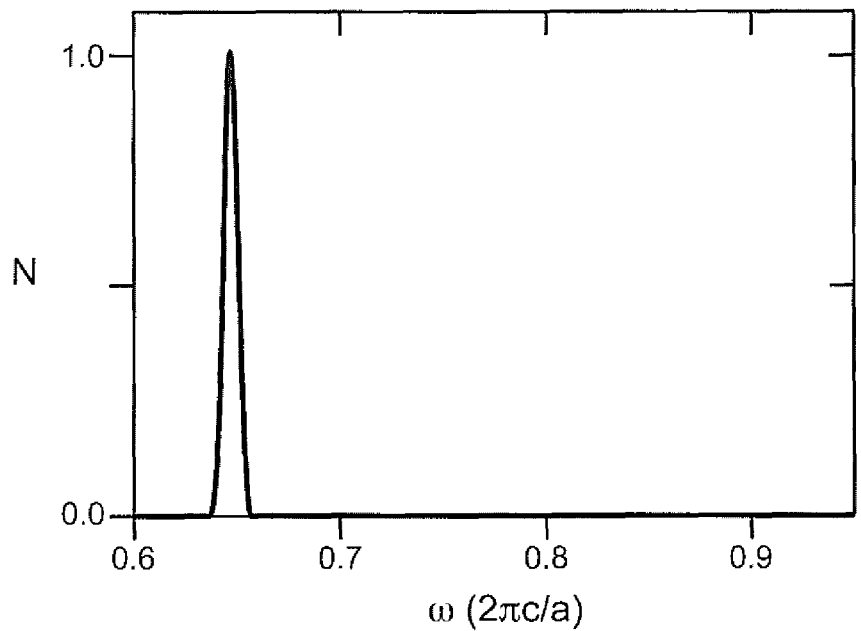
Figure 2C:
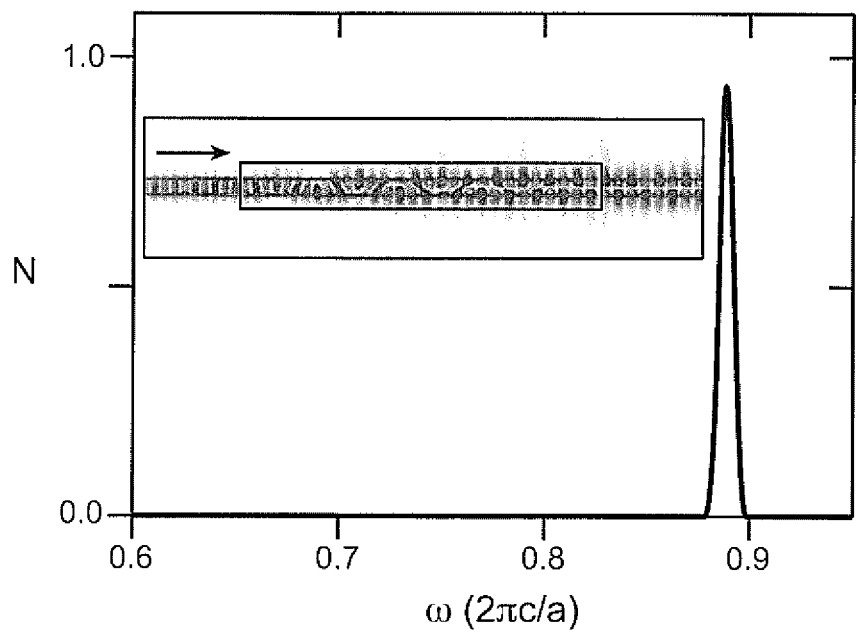
Figure 2D:
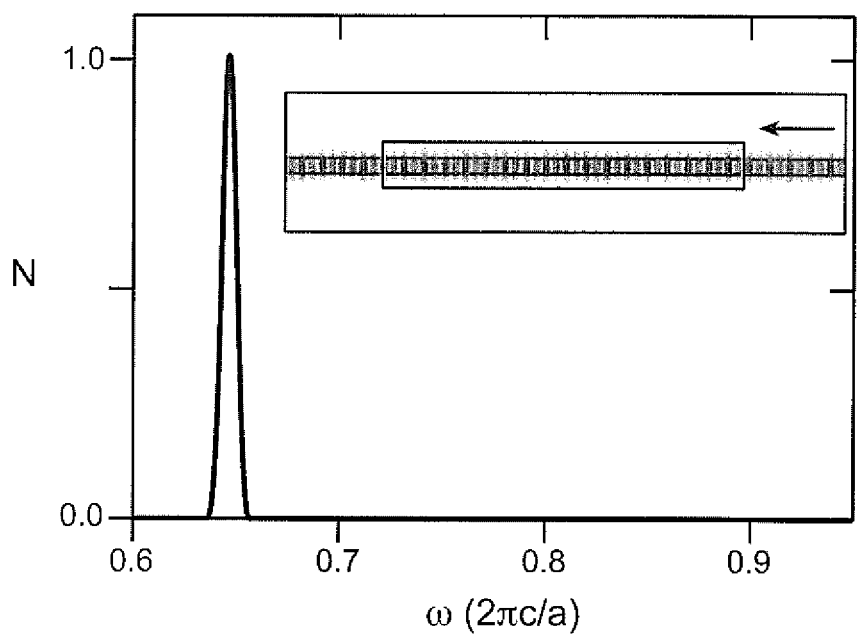

In FIG. 2a we also show an excellent agreement between the theory of equation (3) and the numerical simulation. In the theory, there is no free parameter. All parameters in equation (3) are determined analytically. We note that the coupled mode theory becomes exact in the limit of small index modulation (i.e. $\delta \to 0$). Since the index modulation achievable in experiments is typically far smaller than what we use here in the simulations, the excellent agreement between theory and simulation indicates that the coupled mode theory can be directly applied in experimental situations.

Using the theory of equation (3), we now perform designs assuming index modulation strength of $\delta/\epsilon=4.75\times10^{-3}$, and a modulation frequency of 10 GHz, both of which are achievable in state-of-the-art silicon modulators, see Doug, P. Preble, S. F. Robinson, J. T. Manipatruni, S. & Lipson, M. "Inducing photonic transitions between discrete modes in a silicon optical microcavity," *Phys. Rev. Lett.* 100, 033904 (2008), Preble, S. F. Xu, Q. & Lipson, M. "Changing the colour of light in a silicon resonator," *Nature Photonics*, 1, 293-296 (2007). Such a modulation induces a transition from a $1^{st}$ band mode at 1.55 μm to a $2^{nd}$ band mode 10 GHz higher in frequency. With a choice of the width of the waveguide at 0.27 μm, complete non-reciprocal conversion occurs with a coherent length $l_c=239$ μm.

This waveguide width of 0.27 μm is chosen to create transitions between two parallel bands with matching group velocity. Such a parallel band configuration is optimal since it ensures broadband operation: A modulation that phase-matches between $(\omega_1, k_1)$ and $(\omega_2=\omega_1+\Omega, k_2=k_1+q)$ automatically phase-matches for all incident frequencies in the vicinities of $\omega_1$. For this device, our calculation indicates that, over a frequency bandwidth of 1.2 THz, the conversion efficiency is above 99% for the forward direction at the coherence length, and below 0.1% for the backward direction. Thus such a device can operate over broad range of frequencies, or wavelengths, such as not less than about preferably 0.1%, or more preferably, 0.2% or 0.3% of the wavelength of the light (e.g. 5 nm for 1.55 μm wavelength).

In general, non-reciprocal effects can also be observed in intraband transitions. However, since typically $\Omega \ll \omega_1$, and the dispersion relation of a single band can typically be approximated as linear in the vicinity of $\omega_1$, cascaded process, see Dong, P. Preble, S. F. Robinson, J. T. Manipatruni, S. & Lipson, M. "Inducing photonic transitions between discrete modes in a silicon optical microcavity," *Phys. Rev. Lett.* 100, 033904 (2008), which generates frequencies at $\omega_1+n\Omega$ with $n>1$, is unavoidable, and it complicates the device performance. In contrast, our use of interband transition here eliminates the cascaded processes.

Ring Resonator Structures

Further reduction of the device footprint can be accomplished using resonator structure. As a concrete example, we form a ring resonator (FIG. 3) with the same waveguide as in FIG. 1b with a width of 0.22 μm. The center of the ring waveguide is a circle with a 3 μm radius, chosen such that two modes at $$\omega_1 = 0.6468\left(\frac{2\pi c}{a}\right) \text{ and } \omega_2 = 0.8879\left(\frac{2\pi c}{a}\right)$$

are both resonant. In other words, the circumference of the ring resonator is an integer multiple of at least one wavelength in each of the two photonic bands.

Figure 3:
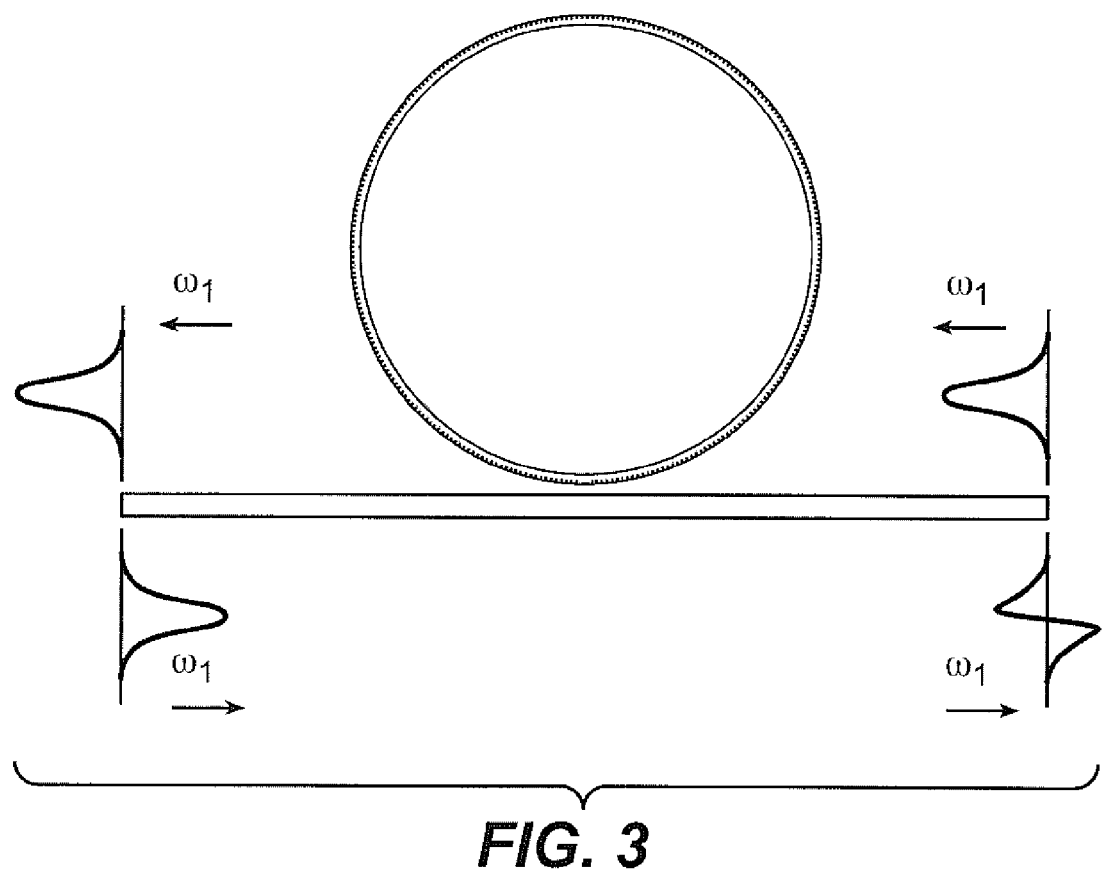

The ring is coupled to an external waveguide. The edge-to-edge distance between the ring and the external waveguides is 0.18 μm, which leads to external quality factors of $Q_{c1}=3426$ and $Q_{c2}=887$ for these two modes respectively due to waveguide-cavity coupling. The two modes also have radiation quality factors of $Q_{r1}=1.9\times10^4$ and $Q_{r2}=2.3\times10^4$. The modulation area consists of an array of discrete regions along the ring (FIG. 3). We choose a modulation strength $$\frac{\delta}{\epsilon} = 4.75\times10^{-3},$$

which results in a coherent length of $l_c=250$ μm. Thus the ring circumference is far smaller than the coherence length.

Figure 4C:
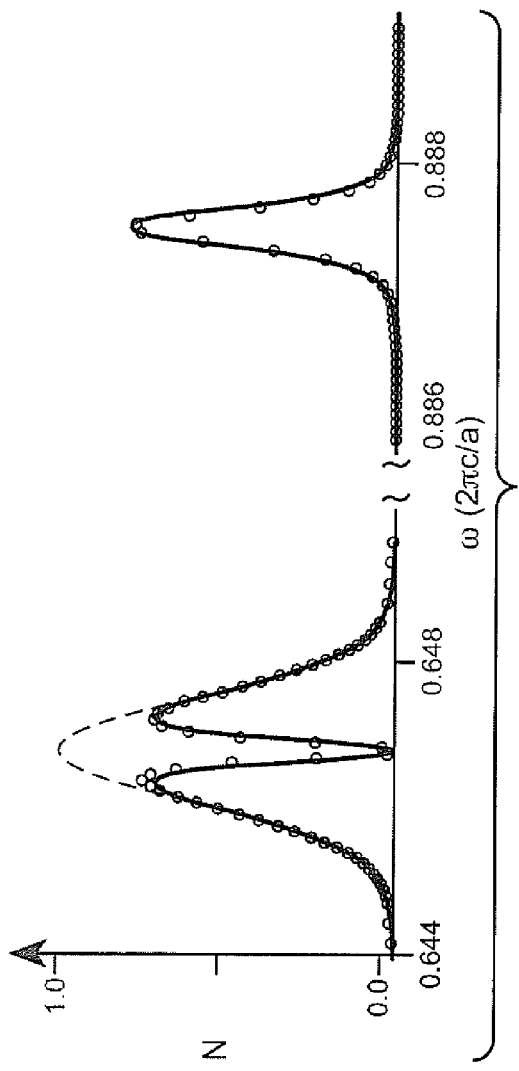
FIGS. 4(a)-4(d) illustrate the field distribution and frequency response of the modulated coupled ring-waveguide structure with incident direction from the left (FIGS. 2(a)-2 (c)) and the right (FIGS. 2(b)-2(d)).
Figure 4D:
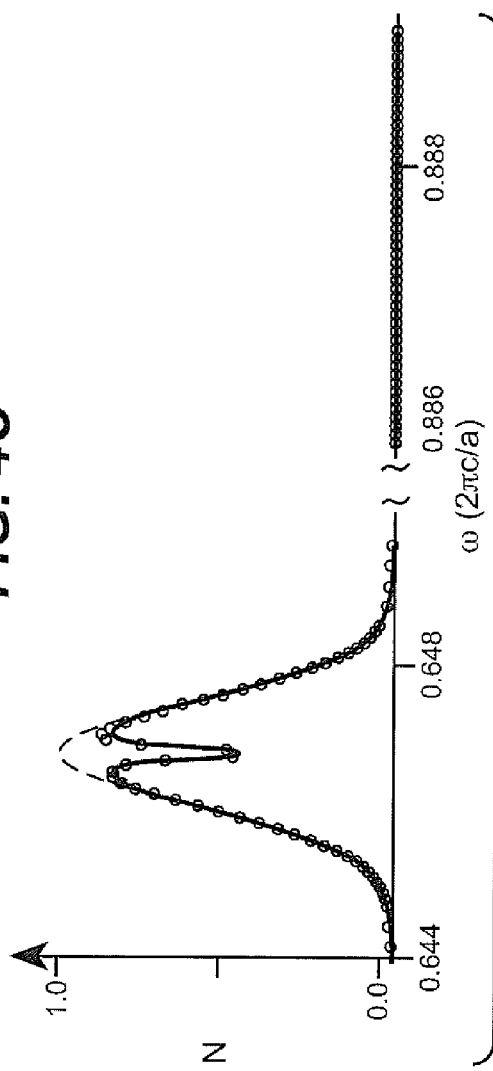
Figure 4A:
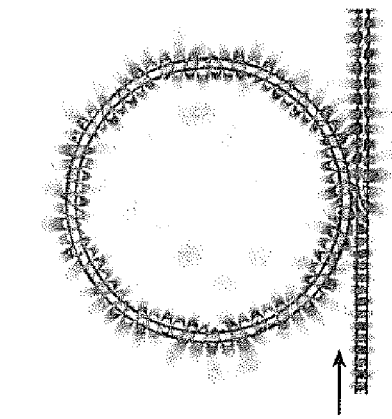
Figure 4B:
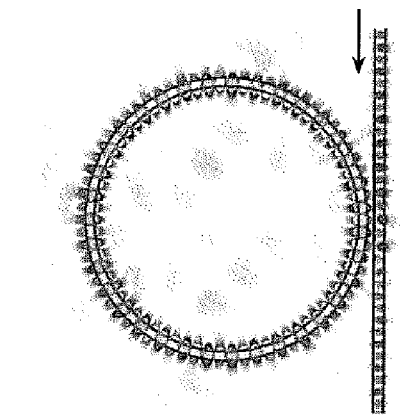

FIGS. 4(a) and 4(b) show the simulation of the structure with steady state input. Incident light at $\omega_1$ from the left (FIG. 4a) is converted to $\omega_2$. Notice the mode profile in the external waveguide changes from symmetric to antisymmetric after light passes through the ring. In contrast, no conversion is observed for light input from the right. The field profile remains symmetric in the external waveguide after the light passes through the ring (FIG. 4b).

FIGS. 4(c) and 4(d) show the output spectra when the input has a Gaussian spectrum centered at $\omega_1$. For light coming from the left, the simultaneous presence of a dip in the vicinity of $\omega_1$ and a peak in the vicinity of $\omega_2$ indicates strong frequency conversion effect (FIG. 4c). The maximum conversion efficiency is about 80%; the rest is lost due to the intrinsic radiation loss of the cavity. In contrast, for light incident from opposite direction (FIG. 4d), the output spectrum shows no feature at $\omega_2$, indicating the absence of frequency conversion. The dip at $\omega_1$ is due purely to the intrinsic radiation loss of the ring. The numerical simulation shows excellent agreement with theoretical calculation (as detailed in the Supplementary Information). The results here demonstrate an ultra-compact non-reciprocal device.

Finally, the photonic transition effect studied here is linear in the sense that the effect does not depend upon the amplitude and phase of the incident light. Having a linear process is crucial for isolation purposes because the device operation needs to be independent of the format, the timing and the intensity of the pulses used in the system. In conclusion, the structure proposed here shows that on-chip isolation can be accomplished with dynamic modulation, in standard material systems that are widely used for integrated optoelectronic applications.

Optical Isolator Design Based on Mach-Zehnder Interferometer.

Photonic transitions in waveguides can create nonreciprocal phase response for counter-propagating modes. Such effect can be used in Mach-Zehnder interferometers to form optical isolators and circulators. Performance of such device is analyzed using coupled mode theory given the experimentally available modulation in silicon. The proposed scheme can provide a broad band (>0.8 THz) with a contrast ratio (>20 dB) optical isolation at telecommunication wavelength. The lack of physical mechanism for on-chip signal isolation has been a fundamental roadblock in integrated optics, see, M. Soljacic, and J. D. Joannopoulos, *Nature Material* 3, 211 (2004). Magneto-optical materials, commonly used in bulk optics for signal isolation purposes, prove to be very difficult to integrate especially on a silicon photonics platform see, R. L. Espinola, T. Izuhara, M. C. Tsai, R. M. Jr. Osgood, and H. Dötsch, *Opt. Lett.* 29, 941 (2004), M. Levy, *J. Opt. Soc. Am. B* 22, 254 (2005), T. R. Zaman, X. Guo, and R. J. Ram, *Appl. Phys. Lett.* 90, 023514 (2007), H. Dötsch, N. Bahlmann, O. Zhuromskyy, M. Hammer, L. Wilkens, R. Gerhardt, P. Hertel, and A. F. Popkov, *J. Opt. Soc. Am. B* 22, 240 (2005). Thus, there has been intense interest for developing optical isolation schemes without using magneto-optical effects, see M. Soljaic, C. Luo, J. D. Joannopoulos, and S. Fan, *Opt. Lett.* 28, 637 (2003), K. Gallo, G. Assanto, K. R. Parameswaran, and M. M. Fejer, *Appl. Phys. Lett.* 79, 314 (2001), Z. Yu and S. Fan, *Nature Photonics* 3, 91 (2009). In this context, here we introduce a dynamic isolator structure, as shown in FIG. 5a, which allows one-way light transmission while completely prohibiting the transmission of light signal in the opposite direction.

Figure 5A:
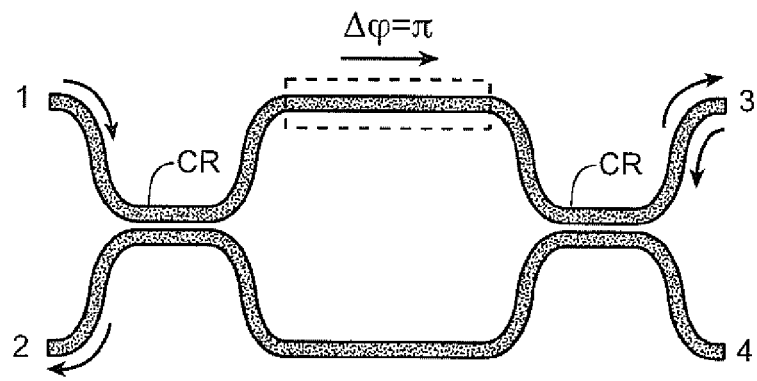
FIG. 5(a) illustrates an optical isolator structure of a Mach-Zehnder interferometer. The dynamic index modulation is applied to the waveguide in the dashed line box.
Figure 5B:
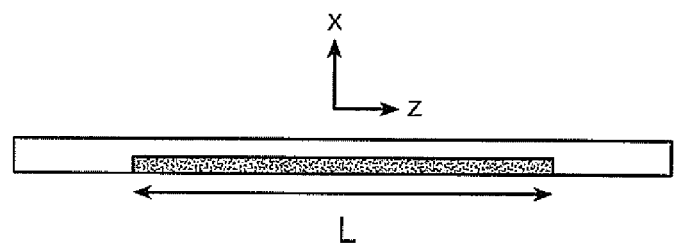
FIG. 5(b) illustrates the structure of the modulated silicon waveguide in the Mach-Zehnder interferometer of FIG. 5(a) where the dynamic index modulation is applied to the black region.
Figure 5C:
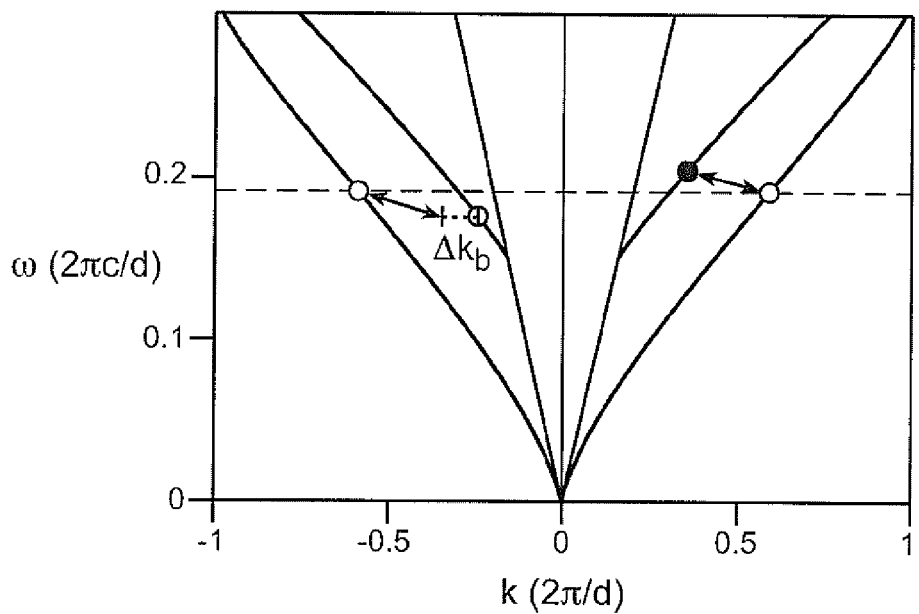
FIG. 5(c) illustrates the dispersion relation of the TE modes in the Mach-Zehnder interferometer of FIG. 5(a). The phase-matching modulation (arrow) induces a photonic transition between modes at $\omega_1$ and $\omega_2$ in the forward direction. In the backward direction, the arrow represents the transition with the smallest phase mismatch.

The proposed device in FIG. 5a is based upon the recent discovery of complete optical isolation effect induced by dynamic modulation, see Z. Yu and S. Fan, *Nature Photonics* 3, 91 (2009). See also S. J. B. Yoo, *Nature Photonics* (News and Views) 3, 77 (2009). The isolation scheme in Z. Yu and S. Fan, *Nature Photonics* 3, 91 (2009). See also S. J. B. Yoo, *Nature Photonics* (News and Views) 3, 77 (2009). used a silicon waveguide that supports two modes with opposite symmetries forming two photonic bands (FIG. 5b). When subject to a refractive index modulation that is both spatial and temporal dependent, as defined by a modulation frequency and a wavevector, the modes inside the waveguide can go through an interband transition, see J. N. Winn, S. Fan, J. D. Joannopoulos, and E. P. Ippen, *Phys. Rev. B* 59, 1551 (1998), (FIG. 5c). Such a transition is highly non-reciprocal: the modulation breaks both time-reversal and spatial inversion symmetry. As a result, inter-band photonic transition process occurs only along the forward direction but not in the backward direction. By choosing an appropriate length of the modulation region, complete frequency conversion can be achieved in the forward direction, while no conversion occurs in the backward direction. (This length is referred to as the coherence length $l_c$ below). In this construction, complete isolation is accomplished by combining the non-reciprocal frequency conversion process, as discussed above, with a filter that removes all the converted light, see Z. Yu and S. Fan, *Nature Photonics* 3, 91 (2009). See also S. J. B. Yoo, *Nature Photonics* (News and Views) 3, 77 (2009).

In this letter, we present an alternative geometry for constructing an optical isolator. The geometry consists of a Mach-Zehnder interferometer, in which one arm of the interferometer consists of the waveguide that is subject to the dynamic modulation described above. The portion of the waveguide in the dashed line box in the upper waveguide of FIG. 5(a) is subject to the dynamic modulation. In contrast to Z. Yu and S. Fan, *Nature Photonics* 3, 91 (2009). See also S. J. B. Yoo, *Nature Photonics* (News and Views) 3, 77 (2009), here the length of the modulation region is chosen to be twice the coherence length. Thus, light passing through the modulated waveguide will remain in the incident frequency. As we will show below, however, such light in fact experiences a phase shift that is non-reciprocal due to the photonic transition effect. The use of a Mach-Zehnder interferometer configuration thus allows an optical isolator to be formed (FIG. 5a). Comparing with the scheme in Z. Yu and S. Fan, *Nature Photonics* 3, 91 (2009). See also S. J. B. Yoo, *Nature Photonics* (News and Views) 3, 77 (2009), here the filter is no longer required, which significantly reduces the device complexity.

We describe the Mach-Zehnder isolator by first briefly reviewing the inter-band transition process in a silicon slab waveguide. The width d of the waveguide (FIG. 5b) is chosen such that the waveguide supports two TE bands, with even or odd symmetry respectively at the operation frequency. An inter-band transition, between two TE modes with frequencies and wavevectors $(\omega_1, k_1)$, $(\omega_2, k_2)$ located in the two bands respectively (FIG. 5c), can be induced by a dielectric constant modulation: $\epsilon'(x,z,t) = \delta(x)\cos(\Omega t + qz)$, where $\delta(x)$ describes the modulation profile in the transverse direction, and the modulation frequency $\Omega = \omega_2 - \omega_1$. (In what follows, the subscripts in k will be used to refer to the two bands.) We choose $\delta(x)$ to be non-vanishing over half of the cross-section of the waveguide, so that these two modes of different spatial symmetries can couple.

In the modulated waveguide, the transition process is described by writing the total electric fields in the waveguide as $$\sum_{i=1,2} a_i(z) E_i(x) e^{i(-k_i z + \omega_i t)},$$

where $E_i$ are modal profiles normalized such that $|a_i|^2$ represent the photon number flux. Assuming incident light into the modulated waveguide having the lower frequency $\omega_1$ (FIG. 5b), the amplitudes of two modes at the end of modulated region can be obtained by a spatial coupled mode theory, see Z. Yu and S. Fan, *Nature Photonics* 3, 91 (2009). See also S. J. B. Yoo, *Nature Photonics* (News and Views) 3, 77 (2009).

$$a_1(z) = e^{-iL\Delta k/2} \left[ \begin{array}{c} \cos\left(\frac{L}{2l_c}\sqrt{\pi^2 + (l_c \Delta k)^2}\right) + \\ i\frac{l_c \Delta k}{\sqrt{\pi^2 + (l_c \Delta k)^2}} \sin \\ \left(\frac{L}{2l_c}\sqrt{\pi^2 + (l_c \Delta k)^2}\right) \end{array} \right] a_1(0) \equiv T a_1(0) \quad (R1)$$

-continued $$a_2(z) = ie^{iL\Delta k/2} \frac{\pi \sin\left(\frac{L}{2l_c}\sqrt{\pi^2 + (l_c\Delta k)^2}\right)}{\sqrt{\pi^2 + (l_c\Delta k)^2}} a_1(0),$$

where $\Delta k = k_2(\omega_2) - k_1(\omega_1) + q$ is the phase mismatch, and the coherent length $$l_c = \frac{2\pi}{\gamma}\sqrt{\frac{v_{g1}v_{g2}}{\omega_1\omega_2}} \approx \lambda_0 \cdot \frac{1}{\gamma} \cdot \frac{v_g}{c}, \quad (R2)$$

where $$\gamma = \frac{\int_{-\infty}^{\infty} \delta(x)E_1(x)E_2(x)dx}{\sqrt{\int_{-\infty}^{\infty}\varepsilon(x)|E_1|^2 dx \int_{-\infty}^{\infty}\varepsilon(x)|E_2|^2 dx}}$$

characterizes the effect of modulation, and is referred to as the modulation strength factor below. $v_{gi}$ are the group velocities of the two modes. In arriving at the final result in Eq. (R2), we have assumed that the modulation frequency is small compared with the optical frequency, hence $\omega_1 \approx \omega_2$. Here, and also in the rest of the paper, we have assumed that the two bands have similar group velocity, i.e. $v_{g1} = v_{g2} = v_g$, which is essential for broad-band operation, see Z. Yu and S. Fan, *Nature Photonics* 3, 91 (2009). See also S. J. B. Yoo, *Nature Photonics* (News and Views) 3, 77 (2009). $\lambda_0$ is the operating wavelength and c is the speed of light in vacuum. We note that such a coupled-mode theory result has been fully validated with full-field finite-difference time-domain simulations, see Z. Yu and S. Fan, *Nature Photonics* 3, 91 (2009). See also S. J. B. Yoo, *Nature Photonics* (News and Views) 3, 77 (2009).

We now consider the property of the Mach-Zehnder interferometer of FIG. 5a, where the upper arm is modulated. We assume that the interferometer has two arms with equal length, and uses two 50/50 waveguide couplers. For such an interferometer, the transmission at frequency $\omega_1$ is described by B. E. A. Saleh, and M. C. Teich, *Fundamentals of Photonics*, $2^{nd}$ ed. p 1033 John Wiley & Sons, Inc, Hoboken, N.J. (2007).

$$\begin{pmatrix} b_u \\ b_l \end{pmatrix}_{OUT} = \frac{1}{2}\begin{pmatrix} 1 & i \\ i & 1 \end{pmatrix}\begin{pmatrix} T\exp(i\varphi_p) & 0 \\ 0 & \exp(i\varphi_p) \end{pmatrix}\begin{pmatrix} 1 & i \\ i & 1 \end{pmatrix}\begin{pmatrix} b_u \\ b_l \end{pmatrix}_{IN}, \quad (R3)$$

where $b_{u/l}$ is the input or output amplitudes in the upper/lower arm and $\varphi_p$ is the phase due to propagation only. T, as defined in Eq. (R1), is the amplitude transmission coefficient for the modulated waveguide.

To describe the isolator action, we first consider light injected into port 1. Assuming a phase-matching modulation, i.e. $\Delta k = k_2(\omega_2) - k_1(\omega_1) + q = 0$, and a length of modulated region $L = 2l_c$, from Eq. (R1) we have $T = -1$, and $a_2(L) = 0$. Hence, the modulation does not create any frequency conversion. Instead its sole effect is to induce an extra $\pi$ phase shift in addition to the propagation phase. As a result, all power ends up as output in port 3.

We now consider the time-reversed scenario where light is injected into port 3 instead. In the modulated waveguide region, the light propagates in the backward direction, and in general the phase matching condition is not satisfied. Suppose the same modulation is strongly phase-mismatched in the backward direction, i.e.

$$\Delta k_b \cdot L = \Delta k_b \cdot 2l_c \gg 1 \quad (R4)$$

from Eq. (R1) then we have $T \approx 1$. Thus, the output completely ends up in port 2. The device therefore functions as a four-port circulator that clearly exhibits strong non-reciprocal behavior.

We now discuss the physical constraints that allow Eq. (R4) to be satisfied in the backward direction. For most electro-optic or acoustic-optic modulation schemes, the modulation frequency $\Omega \ll \omega_1$. In the backward direction, among all possible transitions, the one between the mode at $(\omega_1, -k_1(\omega_1))$ and a lower frequency mode $(\omega_1 - \Omega, -k_2(\omega_1 - \Omega))$ in the $2^{nd}$ band (green dot in FIG. 5c) has the smallest phase mismatch, as described by a $$\Delta k_b = -k_2(\omega_1 - \Omega) + k_1(\omega_1) - q \approx \frac{2\Omega}{v_g}.$$

Combining with the results of coherence length (Eq. (R2)), the condition of Eq. (R4) is then transformed to:

$$\frac{4\lambda_0}{c} \cdot \frac{\Omega}{\gamma} \gg 1 \quad (R5)$$

Remarkably, we note that the effects of weak refractive index modulation and low modulation frequency cancel each other out in Eq. (R5). And it is precisely such a cancellation that enables the construction of dynamic isolators with practical modulation mechanisms.

We now give a numeric example. The width of the silicon slab waveguide ($\varepsilon_s = 12.25$) is chosen as $d = 0.268$ μm such that the first and second bands have approximately the same group velocity for the operation wavelength around 1.55 μm. We consider a modulation frequency $\Omega/2\pi = 20$ GHz and modulation strength $\delta/\varepsilon_s = 5 \times 10^{-4}$, which can be achieved by carrier injection/extraction schemes, see R. A. Soref, and B. R. Bennett, *IEEE J. Quantum Electron.* 23, 123 (1987), L. Liao, A. Liu, D. Rubin, J. Basak, Y. Chetrit, H. Nguyen, R. Cohen, N. Izhaky, and M. Paniccia, *Electron. Lett.* 43, 1196 (2007), Q. Xu, B. Schmidt, S. Pradhan, and M. Lipson, *Nature* 435, 325 (2005). The spatial period of the modulation is $2\pi/q = 0.88$ μm. Such a modulation satisfies the phase-matching condition between a fundamental mode at $$\frac{\omega_1}{2\pi} = 193$$

THz and a $2^{nd}$ band mode that is 20 GHz higher, both propagating in the forward direction. The resulting coherent length for this inter-band transition is $l_c = 2.2$ mm. In the backward direction, we have $\Delta k_b l_c = 6.7$, which is sufficient to satisfy the condition of Eq. (R4).

We apply such modulation to one arm of the Mach-Zehnder interferometer, as shown in FIG. 5a. The length of the modulation region is chosen to be $L = 4.4$ mm. The transmission spectra (FIG. 6a) between ports 3 and 2 can then be obtained using the waveguide dispersion relation determined analytically, and Eq. (R3). The contrast between transmissions of the opposite directions is above 20 dB for a bandwidth of 7 nm.

A dielectric constant modulation based on carrier injection also induces propagation loss. The required dielectric modulation strength $\delta/\varepsilon_s = 5 \times 10^{-4}$ results in a propagating loss of 1.5 cm$^{-1}$ in silicon, see R. A. Soref, and B. R. Bennett, *IEEE J. Quantum Electron.* 23, 123 (1987)

To balance the loss in the interferometer, the same propagation loss is applied to a region of length L in the lower waveguide. In such a situation, the insertion loss is increased to around 6.5 dB while the contrast ratio in transmission between the two counter-propagating directions remains approximately the same as the lossless case (FIG. 6b). Finally, since the length of the proposed device is limited by the coherent length $l_c$. From Eq. (R2), further miniaturization of the device is possible by either increasing the modulation strength, or with the use of slow light waveguide that reduces the group velocity.

Figure 6A:
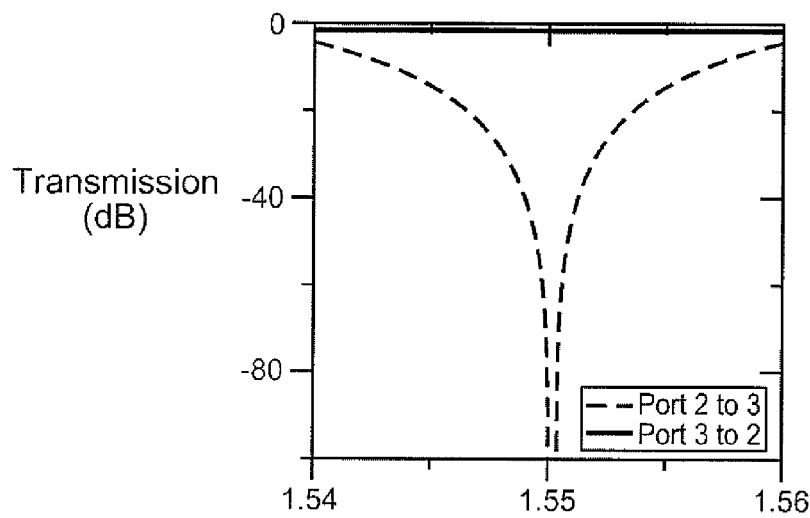
FIG. 6(a) illustrates transmission spectra for the Mach-Zehnder isolator without modulation loss between ports A and D of FIG. 5(b) calculated from coupled mode theory. The waveguide width is 0.22 a. Modulate strength and L=892 a, modulation frequency 20 GHz.
Figure 6B:
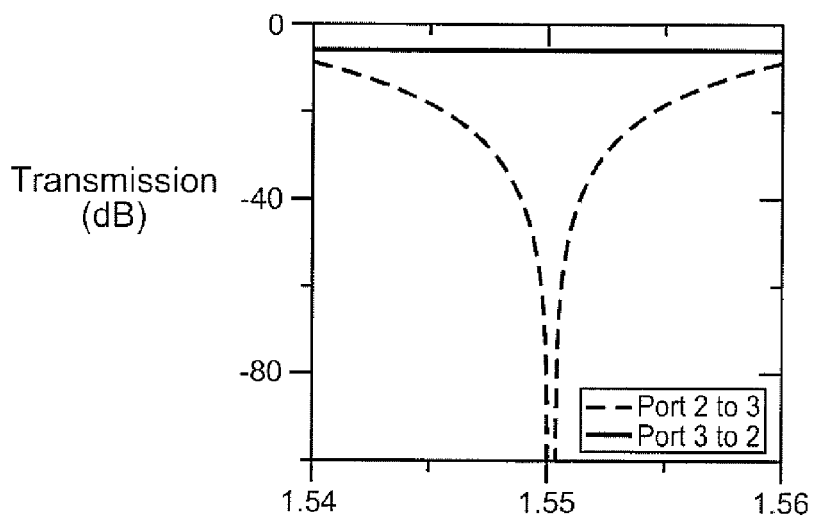
FIG. 6(b) illustrates transmission spectra for the Mach-Zehnder isolator with modulation loss between ports A and D of FIG. 5(b) calculated from coupled mode theory. The waveguide width is 0.22 a. Modulate strength and L=892 a, modulation frequency 20 GHz.

In FIGS. 6(a) and 6(b), the waveguide width is 0.22 a. Modulate strength and L=892 a, modulation frequency 20 GHz. From FIG. 2(a), it is clear that extra phase changes of π may be introduced by increasing the modulation length L by $4l_c$. In general, a phase change of π is introduced during each complete cycle when light experiences a first conversion from $\omega_1$ to $\omega_2$ and a second conversion then back from $\omega_1$ to $\omega_2$. Hence the modulation device causes modulation of light traveling in the at least first photonic structure over a length of the photonic structure that is (2+4N) times a coherence length of the photonic structure, N being zero or a positive integer, so that substantially all of the light in the first photonic band and traveling along a forward direction in the at least first photonic structure is converted to light in a second one of the photonic bands, and then converted back into light in the first photonic band in a cycle in one of (2N+1) cycles, so that a phase delay of π is introduced into the light.

Directional Mode Conversion in Photonic Crystals.

Figure 7:
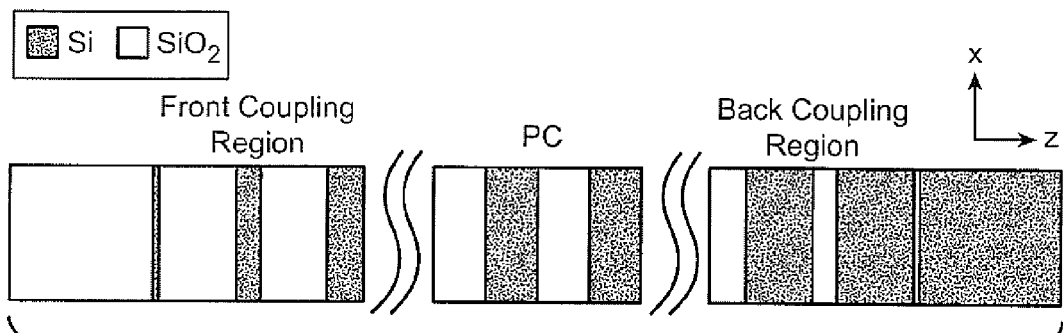
FIG. 7 illustrates a structure of a photonic crystal for optical isolation.
Figure 8A:
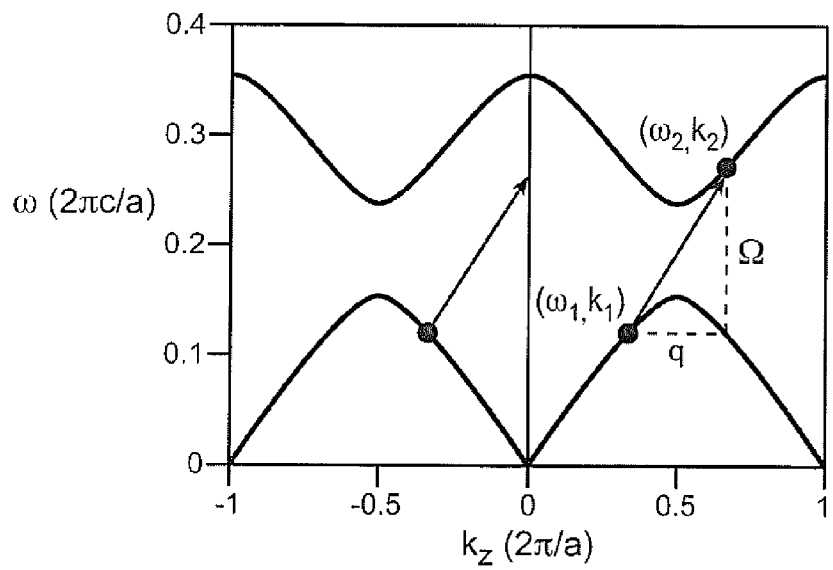
FIG. 8(a) illustrates a bandstructure of a photonic crystal.
Figure 8B:
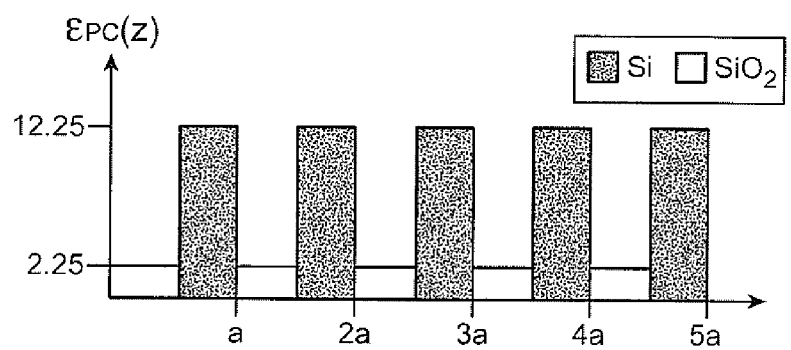
FIG. 8(b) illustrates the dielectric constant of the photonic crystal structure.
Figure 8C:
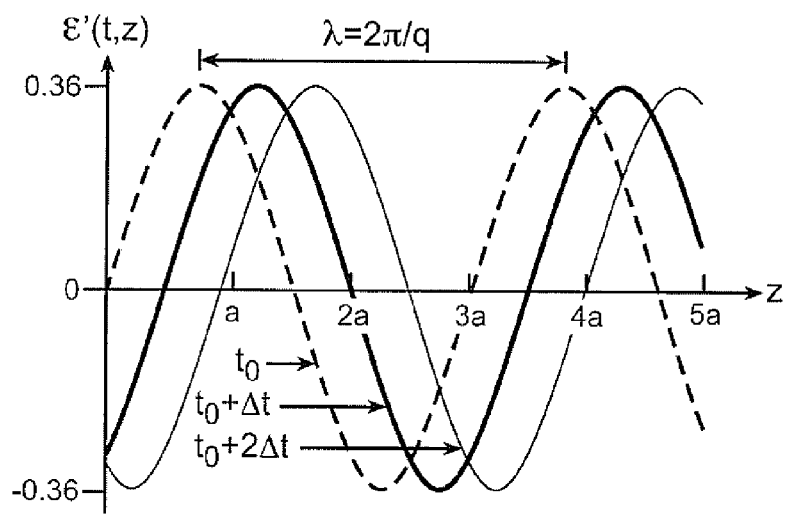
FIG. 8(c) illustrates the profile of perturbation at three sequential time steps in photonic crystal structure of FIG. 8(a).
Figure 9A:
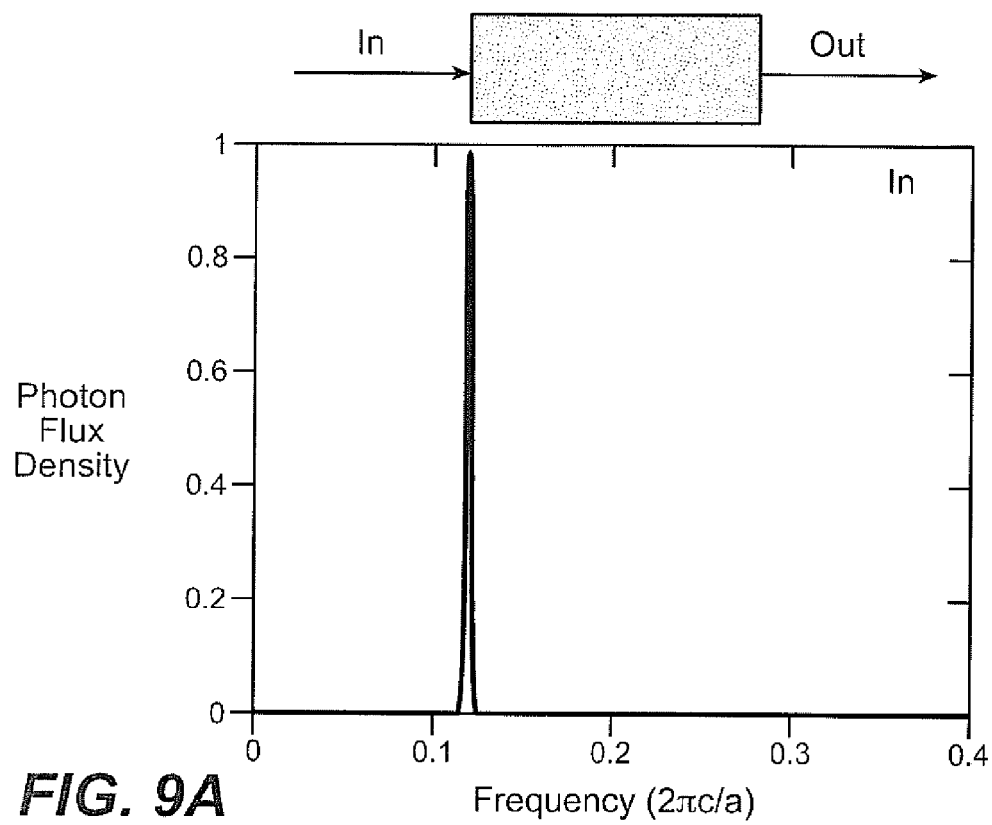
FIG. 9 illustrates the transmission of a Gaussian pulse in forward (FIGS. 9(a)-9(b)) and backward (FIGS. 9(c)-9(d)) directions. Insets show the electrical field intensity.
Figure 9B:
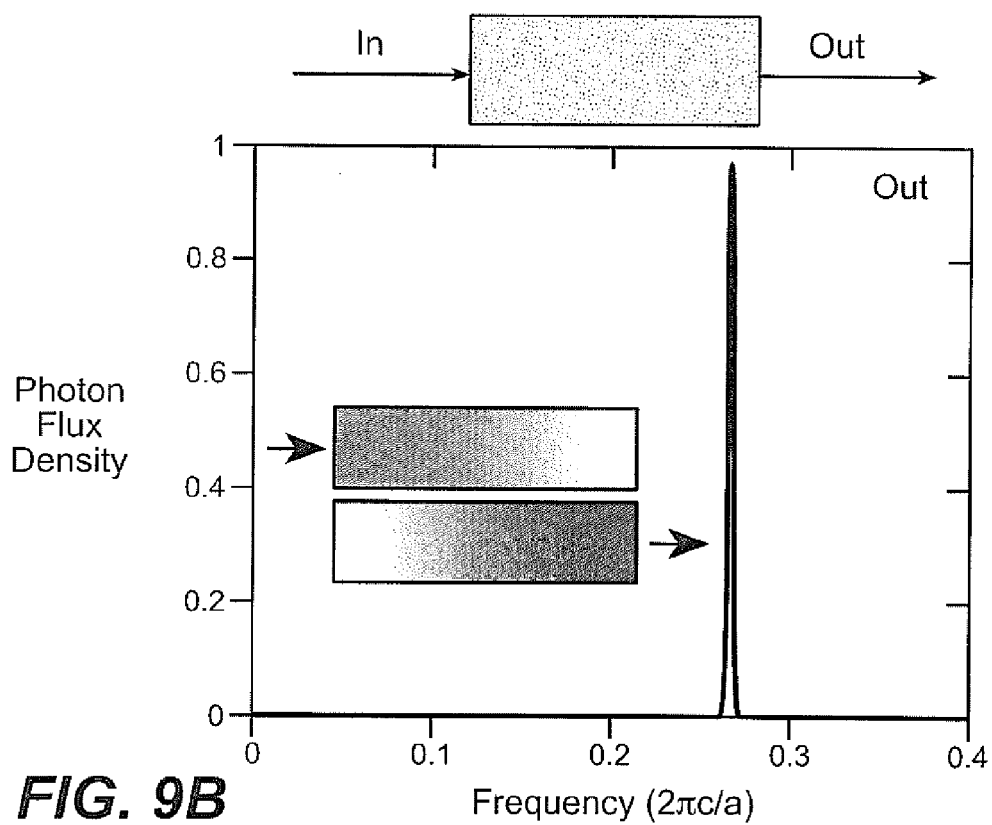
Figure 9C:
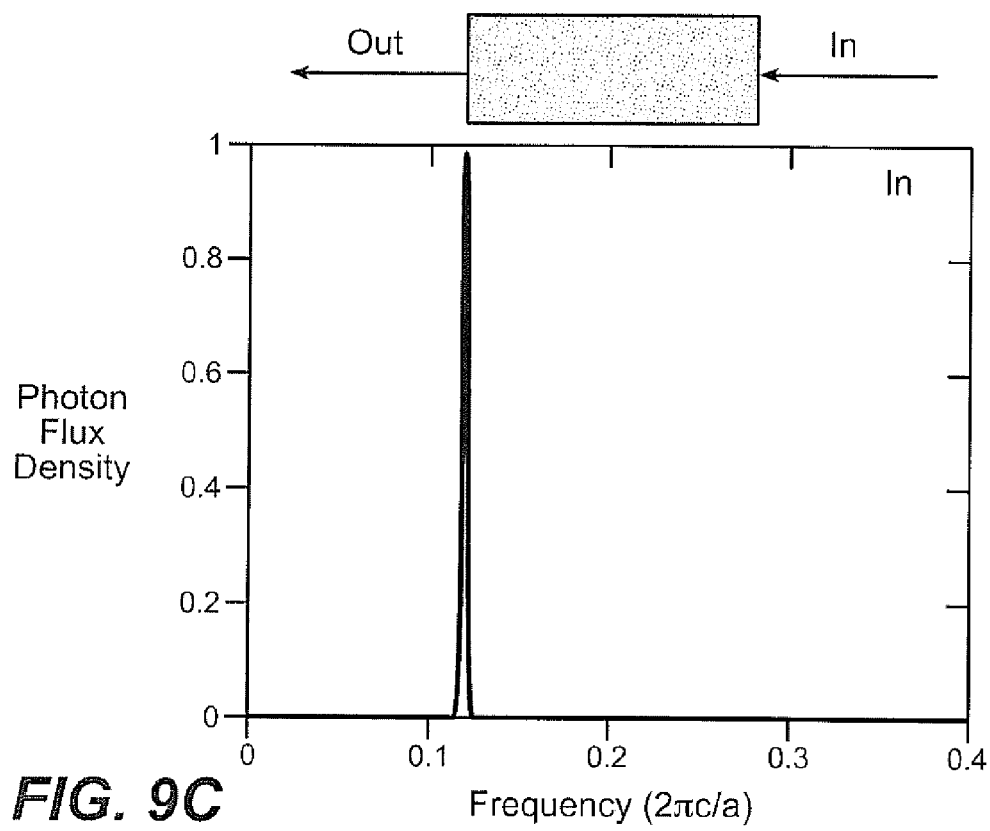
Figure 9D:
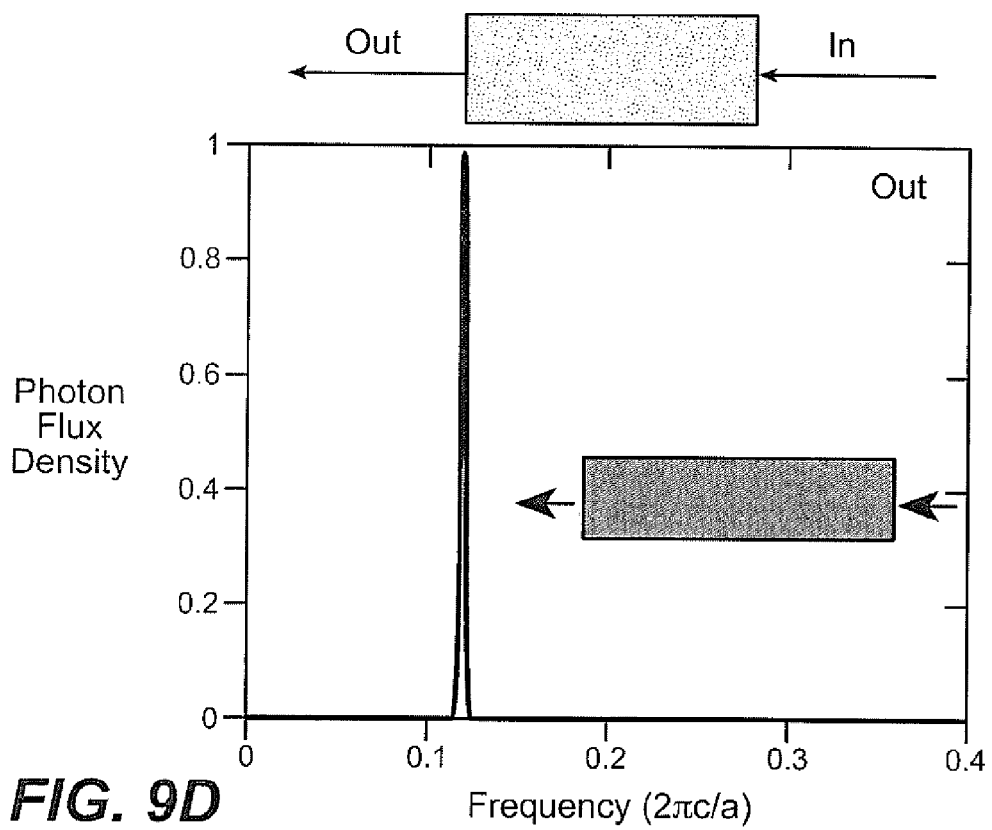

We show here directional mode conversion can be achieved by using indirect interband transition in photonic crystals. FIG. 7 illustrates a structure of a photonic crystal for optical isolation. FIG. 8(a) illustrates a bandstructure of a photonic crystal. FIG. 8(b) illustrates the dielectric constant of the photonic crystal structure. FIG. 8(c) illustrates the profile of perturbation at three sequential time steps in photonic crystal structure of FIG. 8(a). FIG. 9 illustrates the transmission of a Gaussian pulse in forward (FIGS. 9(a)-9(b)) and backward (FIGS. 9(c)-9(d)) directions. Insets show the electrical field intensity.

Complete Optical Isolation Created by Indirect Interband Photonic Transitions

Theory of Non-Reciprocal Frequency Conversion in a Ring Resonator:

To describe the ring resonator system (Supplementary Figure), we consider the transition between two anti-clockwise rotating resonances in the ring. These resonances have frequencies $\omega_1$ and $\omega_2$, and wavevectors in the ring-waveguide $k_1$ and $k_2$ respectively. For these two modes, the coupler is described by:

$$\begin{pmatrix} b_1 \\ B_1 \\ b_2 \\ B_2 \end{pmatrix} = \begin{pmatrix} r_1 & jt_1 & 0 & 0 \\ jt_1 & r_1 & 0 & 0 \\ 0 & 0 & r_2 & jt_2 \\ 0 & 0 & jt_2 & r_2 \end{pmatrix} \begin{pmatrix} a_1 \\ A_1 \\ a_2 \\ A_2 \end{pmatrix}. \tag{S1}$$

Here the subscripts label the two frequencies. $A_{1,2}$ and $a_{1,2}$ ($B_{1,2}$ and $b_{1,2}$) are the photon flux amplitudes in the external and ring waveguides before (after) the coupler. The transmit and transfer coefficients r, t are real, see Haus, H. A. *Waves and fields in optoelectronics*. (Prentice-Hall, Inc., Englewood Cliffs, N.J. 1984), and $r_{1,2}^2+t_{1,2}^2=1$. In the ring, the two resonances are coupled by applying a dielectric constant modulation along the ring with a profile $\delta(x)\cos[(\omega_1-\omega_2)t-(k_1-k_2)z]$, where z measures the propagation distance on the circumference of the ring in counterclockwise direction. Thus, upon completing one round trip, the amplitudes $a_{1,2}$ and $b_{1,2}$ of the two modes are related generally by:

$$\begin{pmatrix} a_1 \\ a_2 \end{pmatrix} = \begin{pmatrix} T_{11} & T_{12} \\ T_{21} & T_{22} \end{pmatrix} \begin{pmatrix} b_1 \\ b_2 \end{pmatrix}, \tag{S2}$$

where the matrix elements are related to the transition amplitudes for a single round trip. With incident light only in mode 1 (i.e. $A_1=1$, $A_2=0$), combined equation (S1) and (S2), we have $$B_1 = \frac{r_1 - T_{11} - r_1 r_2 T_{22} + r_2 \text{Det}[T]}{1 - r_1 T_{11} - r_2 T_{22} + r_1 r_2 \text{Det}[T]}, \tag{S3}$$

where Det stands for determinant. Thus, the condition for complete frequency conversion (i.e. $B_1=0$) is $$r_1 - T_{11} - r_1 r_2 T_{22} + r_2 \text{Det}[T] = 0 \tag{S4}$$

In the case that ring is lossless, Det[T]=1 and $$T_{11} = T_{22} = \cos\left(\frac{\pi}{2}\frac{L}{l_c}\right),$$

where $l_c$ is the coherence length and L is circumference of the ring. Complete conversion between the two modes can be achieved when the length of the ring is chosen to be $$\cos\left(\frac{\pi}{2}\frac{L}{l_c}\right) = \frac{r_1 + r_2}{1 + r_1 r_2}, \tag{S5}$$

With $r_{1,2} \to 1$, $L/l_c \to 0$. The device therefore can provide complete frequency conversion even when its length is far smaller than the coherence length.

We now consider the frequency response of the device, in the presence of loss. We consider a pair of modes $\omega_1+\Delta\omega$ and $\omega_2+\Delta\omega$, so that the frequency difference between them matches the modulation frequency $\omega_2-\omega_1$. Using equation (3) in the paper, the coupling matrix in equation (S2) becomes $$\begin{pmatrix} T_{11} & T_{12} \\ T_{21} & T_{22} \end{pmatrix} = \begin{pmatrix} \exp(i\theta_1(\Delta\omega)) & 0 \\ 0 & \exp(i\theta_2(\Delta\omega)) \end{pmatrix} \tag{S6}$$

$$\exp\left(\int_0^L \begin{pmatrix} -\gamma_1 & iC\exp(-i\Delta kz) \\ iC^*\exp(i\Delta kz) & -\gamma_2 \end{pmatrix} dz\right)$$

where $\gamma_1$ and $\gamma_2$ characterize the radiation loss. $\theta_i=(k(\omega_i)-k(\omega_i+\Delta\omega))L$ is round trip phase delay. In the vicinity of $\omega_1$ and $\omega_2$, we assume a parallel band configuration, thus $\Delta k=k(\omega_2+\Delta\omega)-k(\omega_1+\Delta\omega)-q\approx 0$ for all frequencies. C is assumed to be frequency-independent in a small range of frequency. The combination of equation (S6) and (S1) allows us to determine the response the device in general.

In order to compare to the FDTD simulations of the ring resonator, we calculate, by several independent simulations, the parameters used in above derivation. For the same ring-waveguide system without modulation, the external quality factors due to waveguide-cavity coupling are $Q_{e1}=3426$ and $Q_{c2}=887$ for mode 1 and 2 respectively, corresponding to $r_1=0.96$ and $r_2=0.7$ in equation (S1). The two modes also have a radiation quality factor of $Q_{r1}=1.9\times10^4$ and $Q_{r2}=2.3\times10^4$, corresponding to $\gamma_1 7.5\times10^{-3}$ L$^{-1}$ and $\gamma_2=9.7\times10^{-3}$ L$^{-1}$ in equation (S6). To compute coherent length $l_c$, one can either do direct field integral, or derive from mode conversion rate in a numerical simulation. Here, we simulate a semicircle structure with the same modulation profile. The mode conversion rate from one end of the semicircle to the other is used to derive $l_c$ according to equation (4) in the paper. Since $$l_c = \frac{2\pi}{|C|},$$

and C is real because the modal profile of the waveguide can be taken to be real, this fixes the coupling constant C in equation (S6).

A Double-Waveguide Structure Design for Experimental Realization

One difficulty in implementing the inter-band transition is that the modulation profile typically requires a large wavevector, which means the period of spatial variation is very small, e.g. comparable to optical wavelength. To achieve such spatial modulation, one needs to fabricate numerous sub-micron areas that are separately modulated. This could be very challenging in experiments. To overcome this difficulty, in this supplementary we provide a practical design, where the spatial period of the modulation is significantly increased. Such a design is much more feasible given the current modulation techniques in silicon.

Figure 10A:
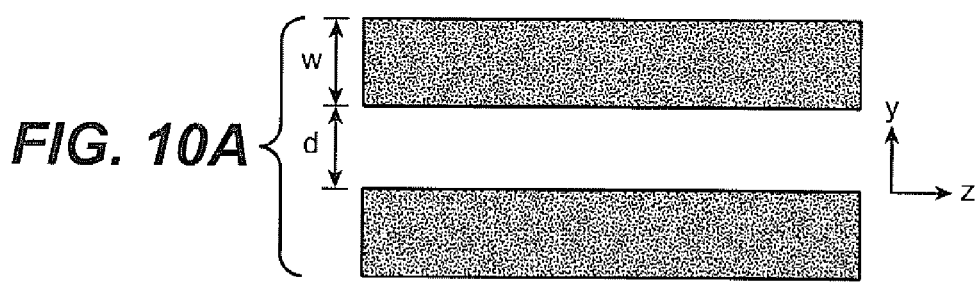
FIG. 10(a) illustrates a two dimensional double waveguide structure.
Figure 10B:
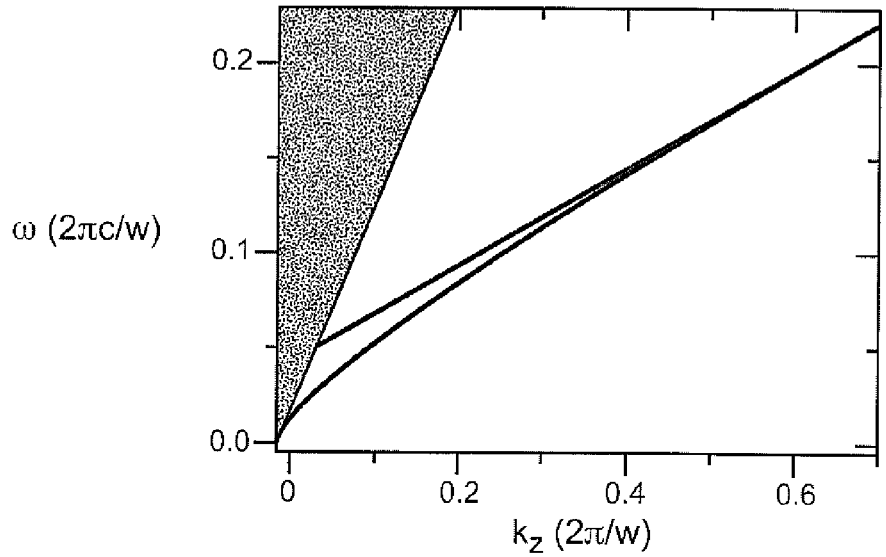
FIG. 10 (b) illustrates a dispersion relation of the structure in FIG. 10(a). Grey areas are radiation modes above the light line.
FIG. 10(c) illustrates a dispersion relation of a double waveguide with d=0.556 w. The dashed lines represent the required wavevectors for resonant condition in ring structure. The arrow indicates a photonic transition induced by modulation.
Figure 10C:
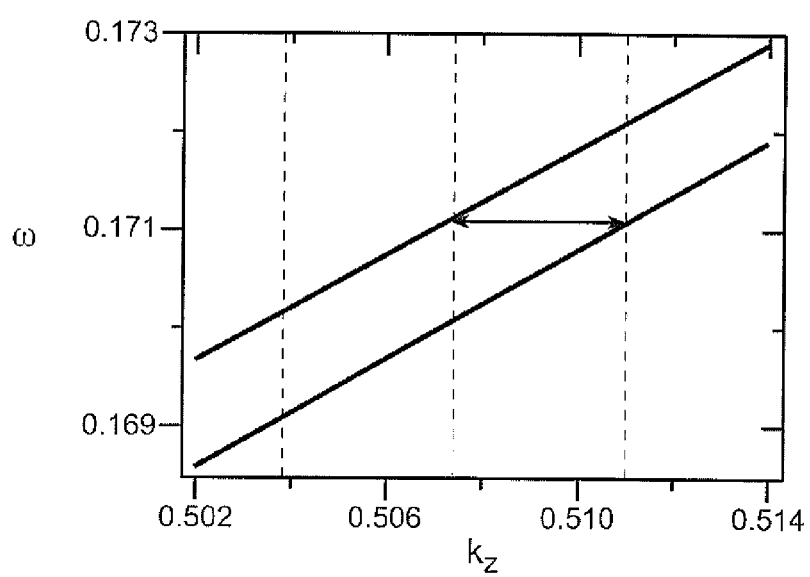

We use a double-waveguide structure consisting of two identical waveguides spaced by distance d (FIG. 10a). Due to the coupling between these two waveguides, the fundamental band of the single-waveguide now splits into two bands: the lower even band and the higher odd band (FIG. 10b). These two bands are very close to each other with the size of the splitting proportional to the coupling strength between the two waveguides. By choosing the distance d, the coupling strength can be designed to be arbitrarily small. Therefore, we can achieve an inter-band transition with much smaller wavevectors. FIG. 10(c) shows the dispersion relation for two waveguides spaced by d=1.11 w, where w is the waveguide width. Preferably the ratio d/w is in a range of about 0.1 to 5. FIG. 10(c) shows in more detail the two bands of FIG. 10b around the value of $k_z$ at 0.5. Here the required wavevector for an inter-band transition is $q/k_z$~0.01. This corresponds a modulation period about $10^2$ μm for the telecommunication wavelength.

In the above described double-waveguide structure, the band width of the two separate photonic bands are not less than about 1% of the wavelength of the light, and more preferably not less than about 2% of the wavelength of the light (e.g. 31 nm for 1.55 μm wavelength).

Figure 11A:
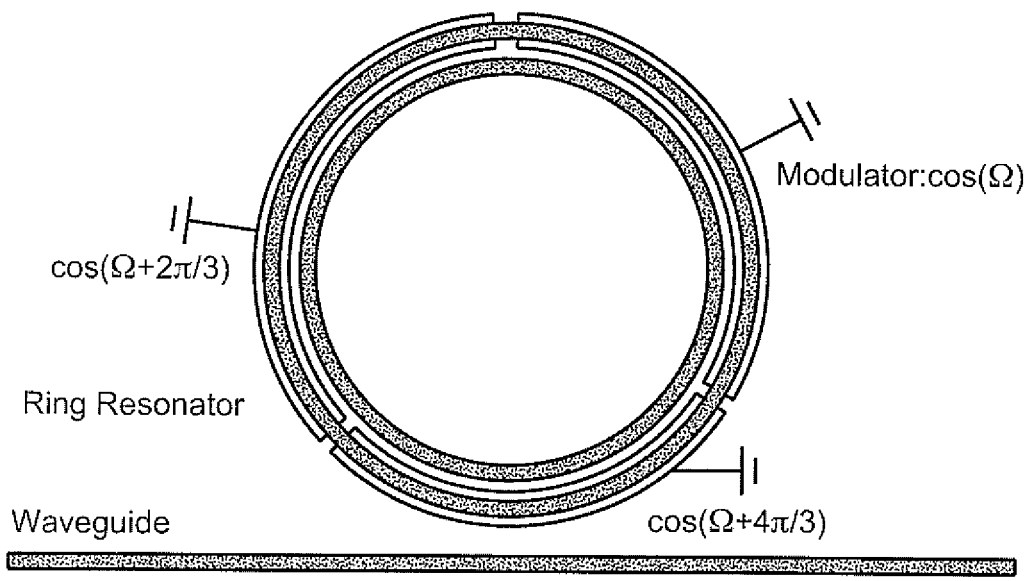
FIG. 11(a) illustrates a structure of an isolator based on ring resonator.

We now provide a specific design using the double-waveguide structure in a ring resonator scheme. The waveguide is 270 nm wide with 300 nm spacing between them (FIG. 11a). We consider a ring consisting of such structure with a radius R=11.43 μm (FIG. 11(a)). In the analysis below, we neglect the bending effect on the dispersion relation of the double-waveguide since the radius is much larger than the width of the waveguide. The resonant modes of the ring are specified by cross points between evenly spaced dashed lines and the dispersion curves (FIG. 2). The spacing is $$\Delta k = \frac{2\pi}{L},$$

where L is circumference of the ring. Here, the radius of the ring is chosen such that there is an even band resonant mode 1 at $$\omega_1 = 0.1711 \frac{2\pi c}{d},$$

and an odd band resonant mode 2 at $\omega_2$ that is 20 GHz higher in frequency, which corresponding an operation wavelength around 1.58 μm. (Such configuration can always be achieved by choosing proper ring radius and operational wavelength.) To induce a transition between these two rotating-wave resonant modes, the phase-matching condition requires a modulation profile $\delta \cos(\Omega t+ql)$, where l measures the distance along the ring in the counter-clockwise direction, $$\frac{\Omega}{2\pi} = 20 \text{ GHz}$$

is the modulation frequency and $$q = \Delta k = \frac{2\pi}{71.82 \text{ μm}}$$

is wavevector. Note here the period of the modulation is the same as the ring circumference. In addition, for a transition between two bands of different spatial symmetries, the modulation is only applied to half of the structure, e.g. the outer waveguide of the ring. We also assume the modulation strength $$\frac{\delta}{\varepsilon} = 2\times10^{-4},$$

corresponding $\Delta n=0.00035$, which is readily available using carrier injection/extraction modulation in silicon. To achieve this modulation profile experimentally, we propose to use three uniformly modulated areas with profile $\delta \cos(\Omega t+\phi_i)$ where the phases $\phi_i$ are chosen to sample the continuous profile at three evenly distributed points (FIG. 11(a)).

To achieve nonreciprocal transmission, a single-waveguide with the same width is side-coupled to the ring (FIG. 11(a)). This waveguide can couple to both even and odd resonant modes. The distance between waveguide and ring is chosen such that the system is in the critical coupling region, meaning that the waveguide-ring coupling rate is the same as the loss rate of the ring. We further assume the quality factor Q of the system is $2.3\times10^4$. The modulation device applies a modulation signal, such as an electromagnetric signal, across only one of the two rings. Electromagnetic signals are applied at three locations as shown in FIG. 11(a), to one of the rings. The technique described in Xu et al., "Micrometer-Scale Silicon Electro-Optic Modulator", Nature, Vol 435., No. 19, May 2005, pp. 325-27 may be used for applying the electromagnetic signals.

For lights incident in the backward direction, there is no photonic transition in the ring due to the phase-mismatch.

Figure 11B:
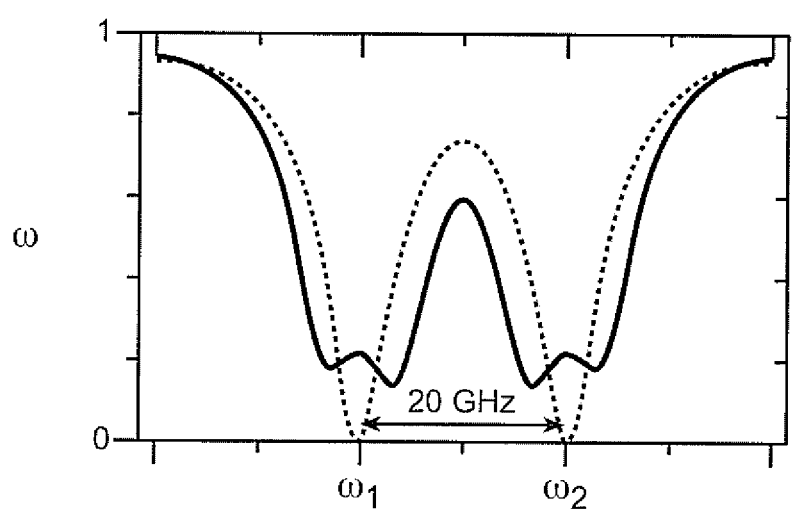
FIG. 11(b) illustrates the transmission spectra for structure in FIG. 11(a). Dashed line is for backward transmission and solid for forward. The ring resonant modes located at $\omega_1$ and $\omega_2$ with even and odd modal symmetries respectively.

Therefore the transmission vanishes at the resonant frequencies (FIG. 11(b) dashed line). However, in the forward direction, the critical coupling condition is ruined by the presence of inter-band transition, causing finite transmission at the resonant frequency (FIG. 11(b) solid line). The maximum contrast ratio between forward and backward transmission is above 50 dB at the resonant frequency. The detailed analysis is provided below.

Coupled Mode Theory Analysis of the Transmission in a Ring-Waveguide Coupled System.

In this section, we describe the coupled-mode model used in calculating the transmission spectral in FIG. 11(b). To characterize the behavior of the system, we need to consider 9 modes at three frequencies in three bands. We use A (C) to represent the odd (even) modes in the ring and B for modes in the external coupling waveguide. The subscripts denote the frequencies: 2 represents the incident frequency while 1(3) represents modes that are $\Omega$ higher (lower) in frequency.

We analyze the modal amplitudes to the left and to the right of the waveguide-ring coupling region. The coupling between the ring and external waveguide can be described by:

$$\begin{pmatrix} A_i \\ B_i \\ C_i \end{pmatrix}_R = T_c \begin{pmatrix} A_i \\ B_i \\ C_i \end{pmatrix}_L \quad \text{(T1)}$$

where $T_c$ is coupling matrix determined by the spacing between waveguide and ring. In the ring, modes to right of the coupling region propagate and return to the left of the coupling region. In this process, the modulation induces transitions between the following modes:

$$\begin{pmatrix} A_1 \\ C_2 \end{pmatrix}_L = \begin{pmatrix} \exp(i\varphi_{A1} - \gamma) & 0 \\ 0 & \exp(i\varphi_{C2} - \gamma) \end{pmatrix} T_m \begin{pmatrix} A_1 \\ C_2 \end{pmatrix}_R \quad \text{(T2)}$$

$$\begin{pmatrix} A_2 \\ C_3 \end{pmatrix}_L = \begin{pmatrix} \exp(i\varphi_{A2} - \gamma) & 0 \\ 0 & \exp(i\varphi_{C3} - \gamma) \end{pmatrix} T_m \begin{pmatrix} A_2 \\ C_3 \end{pmatrix}_R \quad \text{(T3)}$$

where matrix $T_m$ describes the transition effect, $\phi$ and $\gamma$ are propagation phases and loss rate. For modes at $C_1$ and $A_3$:

$$C_{1L} = \exp(i\varphi_{C1} - \gamma) C_{1R} \quad A_{3L} = \exp(i\varphi_{A3} - \gamma) A_{3R} \quad \text{(T4)}$$

The incident light is written as $$\begin{pmatrix} B_1 \\ B_2 \\ B_3 \end{pmatrix}_L = \begin{pmatrix} 0 \\ 1 \\ 0 \end{pmatrix} \quad \text{(T5)}$$

The transmission spectral can then be numerically solved by combing Eq. (T1-T5) and dispersion relation, which determines all the propagation phases.

A similar analysis can be performed for light incident in the backward direction. However, the modulation does not induce transition two resonant modes. The transmission is then mostly determined by the coupling between the waveguide and ring.

While the invention has been described above by reference to various embodiments, it will be understood that changes and modifications may be made without departing from the scope of the invention, which is to be defined only by the appended claims and their equivalent. All references referred to herein are incorporated by reference herein in their entireties.

What is claimed is:

1. An apparatus for modulating light, comprising:
   at least a first photonic structure that has two separate photonic bands, said at least first photonic structure having a refractive index; and
   a device temporarily modulating the refractive index of the at least first photonic structure, so that light supplied to the at least first photonic structure and initially in a first one of the photonic bands traveling along a forward direction in the at least first photonic structure is converted to light in a second one of the photonic bands without altering a polarization state of the light, and light in the first photonic band traveling along a backward direction opposite to the forward direction in the at least first photonic structure is not converted and remains in the first photonic band, and so that the at least first photonic structure is non-reciprocal with respect to light traveling in the forward and backward directions.

2. The apparatus of claim 1, wherein said device applies signals to the at least first photonic structure, said signals having a frequency substantially equal to a difference between center frequencies of the two photonic bands.

3. The apparatus of claim 2, said device modulating the at least first photonic structure at locations that are spaced apart from one another, by means of different signals applied at such locations to the at least first photonic structure.

4. The apparatus of claim 3, wherein the locations to which different signals are applied are spaced evenly apart at one third or one quarter of a spatial modulation period of the at least first photonic structure.

5. The apparatus of claim 1, wherein the device modulates light traveling in the at least first photonic structure over a length of the photonic structure that is an odd multiple of a coherence length of the photonic structure, so that substantially all of the light in the first photonic band traveling along a forward direction in the at least first photonic structure is converted to light in a second one of the photonic bands.

6. The apparatus of claim 1, further comprising a filter that has a pass band that overlaps one of the two photonic bands, said apparatus being an optical isolator.

7. The apparatus of claim 1, wherein the device causes modulation of light traveling in the at least first photonic structure over a length of the photonic structure that is (2+4N) times a coherence length of the photonic structure, N being zero or a positive integer, so that substantially all of the light in the first photonic band traveling along a forward direction in the at least first photonic structure is converted to light in a second one of the photonic bands, and then converted back into light in the first photonic band in a cycle in one of (2N+1) cycles, so that a phase delay of $\pi$ is introduced into the light.

8. The apparatus of claim 1, further comprising a second elongated photonic structure, wherein said at least first photonic structure comprises a ring photonic structure side coupled to the second photonic structure, said ring photonic structure having a circumference that is substantially an integer multiple of at least one wavelength in each of the two photonic bands.

9. The apparatus of claim 1, wherein a bandwidth of each of the two photonic bands exceeds about 0.1% of a wavelength of the light.

10. The apparatus of claim 1, further comprising a second photonic structure aligned with and coupled to said at least first photonic structure so that a bandwidth of each of the two photonic bands exceeds 1% of a wavelength of the light.

11. The apparatus of claim 10, wherein said second photonic structure and said at least first photonic structure are ring photonic structures, said apparatus further comprising a third photonic structure side coupled to said at least first photonic structure and the second photonic structure.

12. The apparatus of claim 10, wherein the second photonic structure and said at least first photonic structure are elongated in shape, substantially parallel to each other, and spaced apart by a distance d, and have substantially the same width w, and wherein a ratio d/w is within a range of about 0.1 to 5.

13. The apparatus of claim 1, said device modulating the refractive index of the at least first photonic structure by applying an acoustic or electromagnetic signal to the at least first photonic structure.

14. The apparatus of claim 1, said the at least first photonic structure comprising a photonic crystal or dielectric material.

15. An apparatus for modulating light, comprising:
  at least a first photonic structure that has two separate photonic bands, said at least first photonic structure having a refractive index; and
  a device modulating temporarily the refractive index of the at least first photonic structure, so that light supplied to the at least first photonic structure and initially in a first one of the photonic bands traveling along a forward direction in the at least first photonic structure is converted to light in a second one of the photonic bands, and light in the first photonic band traveling along a backward direction opposite to the forward direction in the at least first photonic structure is not converted and remains in the first photonic band, and so that the at least first photonic structure is non-reciprocal with respect to light traveling in the forward and backward directions, wherein a bandwidth of each of the two photonic bands exceeds 0.1% of a wavelength of the light.

16. An interferometer, comprising:
  a first photonic structure and a second photonic structure coupled to the at least first photonic structure at two coupler regions, said first photonic structure having two separate photonic bands and a refractive index; and
  a device temporarily modulating the refractive index of the first photonic structure, so that light supplied to the first photonic structure and initially in a first one of the photonic bands traveling along a forward direction in the first photonic structure is converted to light in a second one of the photonic bands, and light in the first photonic band traveling along a backward direction opposite to the forward direction in the at least first photonic structure is not converted and remains in the first photonic band;
  wherein light supplied to a first end of the first photonic structure and initially in the first photonic band traveling along a forward direction in the photonic structures will pass to a second end of the first photonic structure, and light supplied to the second end of the first photonic structure and traveling along a backward direction in the photonic structures will pass to a first end of the second photonic structure.

17. The interferometer of claim 16, wherein when the device stops modulating the refractive index of the at least first photonic structure, light supplied to first end of the first photonic structure and initially in the first photonic band traveling along a forward direction in the first photonic structure will pass to a second end of the second photonic structure, and light supplied to the second end of the second photonic structure and traveling along a backward direction in the second photonic structure will pass to the first end of the first photonic structure.

18. A method for modulating light, comprising:
  providing at least one photonic structure that has two separate photonic bands, said at least one photonic structure having a refractive index; and
  supplying light initially in a first one of the photonic bands to the at least one photonic structure and traveling along a forward direction in the at least one photonic structure;
  modulating temporarily the refractive index of the at least one photonic structure, so that the light traveling along a forward direction in the at least one photonic structure is converted to light in a second one of the photonic bands, so that the at least one photonic structure is non-reciprocal with respect to light traveling in the forward and backward directions; and
  supplying to the at least one photonic structure light in the first photonic band traveling along a backward direction opposite to the forward direction in the at least one photonic structure, such light remaining in the first photonic band without being converted.

19. The method of claim 18, further comprising providing an output of the light in the second one of the photonic bands from the at least one photonic structure, after the light is converted from that in the first one of the photonic bands to light in the second one of the photonic bands.

20. The method of claim 18, further comprising filtering light in one of the two photonic bands to perform an isolation function.

21. A method for modulating light in an interferometer, comprising a first photonic structure and a second photonic structure coupled to the first photonic structure at two coupler regions, said first photonic structure having two separate photonic bands and a refractive index; said method comprising:
  supplying to the first photonic structure light initially in a first one of the photonic bands traveling along a forward direction in the at least first photonic structure;
  modulating temporarily the refractive index of the first photonic structure, so that light initially in the first one of the photonic bands is converted to light in a second one of the photonic bands, and light in the first photonic band traveling along a backward direction opposite to the forward direction in the first photonic structure is not converted and remains in the first photonic band;
  wherein light supplied to a first end of the first photonic structure and initially in the first photonic band traveling along a forward direction in the photonic structures will pass to a second end of the first photonic structure, and light supplied to the second end of the first photonic structure and traveling along a backward direction in the photonic structures will pass to an end of the second photonic structure.

* * * * *